(12) United States Patent
Felt et al.

(10) Patent No.: US 9,706,241 B2
(45) Date of Patent: Jul. 11, 2017

(54) SYSTEMS AND METHODS FOR CASTING A GRAPHICAL USER INTERFACE DISPLAY OF A MOBILE DEVICE TO A DISPLAY SCREEN ASSOCIATED WITH A SET-TOP-BOX DEVICE

(75) Inventors: Michelle Felt, Randolph, NJ (US); Nader Gharachorloo, Ossining, NY (US); Donald H. Relyea, Dallas, TX (US); Manishi Sharma, Gachibowli (IN)

(73) Assignee: VERIZON PATENT AND LICENSING INC., Basking Ridge, NJ (US)

( * ) Notice: Subject to any disclaimer, the term of this patent is extended or adjusted under 35 U.S.C. 154(b) by 1055 days.

(21) Appl. No.: 12/568,999

(22) Filed: Sep. 29, 2009

(65) Prior Publication Data

US 2011/0074794 A1    Mar. 31, 2011

(51) Int. Cl.
*G06F 13/14* (2006.01)
*H04N 21/41* (2011.01)
*H04N 21/422* (2011.01)
*H04N 21/482* (2011.01)

(52) U.S. Cl.
CPC ..... *H04N 21/4126* (2013.01); *H04N 21/4122* (2013.01); *H04N 21/42209* (2013.01); *H04N 21/482* (2013.01)

(58) Field of Classification Search
CPC .............................. G06F 3/0484; G06F 3/0481
USPC ......................................................... 715/781
See application file for complete search history.

(56) References Cited

U.S. PATENT DOCUMENTS

| | | | |
|---|---|---|---|
| 6,049,831 A * | 4/2000 | Gardell et al. | 709/236 |
| 2003/0117430 A1* | 6/2003 | Reynolds | H04N 5/44543 715/721 |
| 2003/0135860 A1 | 7/2003 | Dureau | |
| 2004/0073915 A1* | 4/2004 | Dureau | 725/9 |
| 2005/0108634 A1* | 5/2005 | Sahota et al. | 715/513 |
| 2005/0174488 A1* | 8/2005 | Chennakeshu | 348/552 |
| 2005/0251821 A1* | 11/2005 | Pina | 725/39 |
| 2006/0259942 A1* | 11/2006 | Toyama et al. | 725/133 |
| 2007/0288426 A1* | 12/2007 | Schachter | G06F 17/30884 |
| 2008/0117922 A1* | 5/2008 | Cockrell et al. | 370/401 |
| 2008/0201751 A1* | 8/2008 | Ahmed et al. | 725/109 |
| 2008/0216134 A1* | 9/2008 | Tecot | G11B 27/10 725/92 |
| 2008/0320543 A1* | 12/2008 | Wang et al. | 725/131 |
| 2009/0228919 A1* | 9/2009 | Zott et al. | 725/34 |
| 2010/0077058 A1* | 3/2010 | Messer | H04L 67/02 709/219 |
| 2010/0186027 A1* | 7/2010 | Hou et al. | 725/31 |
| 2014/0032635 A1* | 1/2014 | Pimmel et al. | 709/203 |

* cited by examiner

*Primary Examiner* — Tadeese Hailu
*Assistant Examiner* — Darrin Hope

(57) ABSTRACT

Exemplary multi-screen casting systems and methods are disclosed. For example, systems and methods for casting a graphical user interface display of a mobile device to a display screen associated with a set-top-box device are disclosed. An exemplary method includes a multi-screen casting system establishing a multi-screen display relationship between a mobile device and a set-top-box device, identifying data associated with a graphical user interface display of the mobile device, and transmitting the identified data associated with the graphical user interface display of the mobile device to the set-top-box device for display by a display device associated with the set-top-box device. Corresponding methods and systems are also disclosed.

25 Claims, 16 Drawing Sheets

SYSTEMS AND METHODS FOR CASTING A GRAPHICAL USER INTERFACE DISPLAY OF A MOBILE DEVICE TO A DISPLAY SCREEN ASSOCIATED WITH A SET-TOP-BOX DEVICE

BACKGROUND INFORMATION

Set-top-box devices have provided users of such devices with access to a large number and variety of media content programs and services. For example, a user may choose to experience a variety of broadcast television programs, pay-per-view services, video-on-demand programming, and audio programming via a set-top box.

However, certain set-top-box devices, such as legacy set-top-box devices, have limited resources and, consequently, limited functionality. For example, certain legacy set-top-box devices lack sufficient memory resources to run a full web browser application and/or sufficient processing capacity to interpret Hypertext Markup Language ("HTML") code. Accordingly, such set-top-box devices are unable to provide traditional web browsing functionality to users. In addition, costs and/or logistics associated with replacing or upgrading such set-top-box devices may be prohibitive.

BRIEF DESCRIPTION OF THE DRAWINGS

The accompanying drawings illustrate various embodiments and are a part of the specification. The illustrated embodiments are merely examples and do not limit the scope of the disclosure. Throughout the drawings, identical or similar reference numbers designate identical or similar elements.

DETAILED DESCRIPTION OF PREFERRED EMBODIMENTS

Exemplary multi-screen casting systems and methods are disclosed. For example, systems and methods for casting a graphical user interface display of a mobile device to a display screen associated with a set-top-box device are disclosed. Such systems and methods may provide a user (e.g., a user of an end-user device and/or a subscriber to a service) with a linked multi-screen display experience. For instance, a user of a mobile device (e.g., a mobile phone device) may utilize a web browser application running on the mobile device to request and receive certain data content, which may be displayed in a graphical user interface display (e.g., a browser interface display) of the mobile device. The mobile device may provide one or more input tools that may be utilized by the user to control the browsing experience and display.

In addition to presenting the graphical user interface display on a display screen of the mobile device, the graphical user interface display of the mobile device may be cast to a display device associated with (e.g., a television connected to) a set-top-box device. Accordingly, the user may be able to view the graphical user interface display on the display screen of the mobile device and on a display screen of the display device associated with the set-top-box device. In some examples, the display device associated with the set-top-box device may provide superior display qualities (e.g., larger screen size and/or resolution) compared to the display screen of the mobile device. Conversely, in some examples, the mobile device may provide superior user input control tools compared to the set-top-box device. Accordingly, certain exemplary system and method disclosed herein may leverage the user input control tools of a mobile device and the display qualities of a display device associated with a set-top-box device to provide a multi-screen display experience.

Exemplary multi-screen casting systems and methods will now be described with reference to the accompanying drawings.

Figure 1:
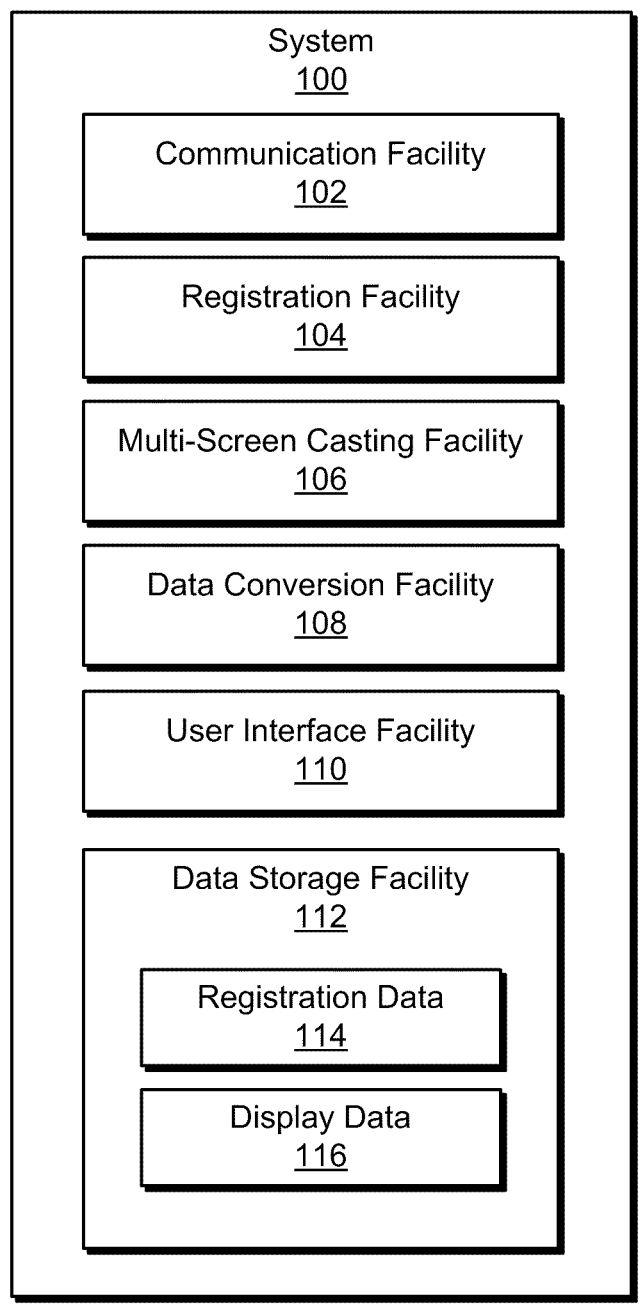
FIG. 1 illustrates an exemplary multi-screen casting system.

FIG. 1 illustrates an exemplary multi-screen casting system 100 (or simply "system 100"). While an exemplary system 100 is shown in FIG. 1, the components and configuration of system 100 illustrated in FIG. 1 are not intended to be limiting. Additional or alternative components and/or configurations may be used in other embodiments. In certain alternative embodiments, for example, one or more of the components shown in FIG. 1 may be omitted or combined.

System 100 may include, but is not limited to, a communication facility 102, a registration facility 104, a multi-screen casting facility 106, a data conversion facility 108, a user interface facility 110, and a data storage facility 112 selectively and communicatively coupled one to another. Any suitable communication technologies, including any of the communication technologies mentioned herein, may be employed to facilitate communications between facilities 102-112.

Communication facility 102 may be configured to communicate with one or more computing devices. In particular, communication facility 102 may be configured to transmit and/or receive communication signals and/or data to/from a mobile device, a set-top-box device, a server device (e.g., a proxy server, a web server, an e-mail server, and/or a data server), a network device, a wireless network device (e.g., a local wireless network router such as a Wi-Fi enabled router), and/or any other computing device. Examples of communication facility 102 include, without limitation, a wired network interface (such as a network interface card), a wireless network interface (such as a wireless network interface card), a modem, an optical fiber network terminal, and any other suitable interface. Any suitable communication technologies, including any of the communication technologies mentioned herein, may be employed by communication facility 102 to communicate with one or more computing devices.

Registration facility 104 may be configured to perform one or more operations associated with registering computing devices for participation in multi-screen casting of a graphical user interface display. For example, registration facility 104 may be configured to establish a multi-screen display relationship between two or more computing devices, such as between a mobile device and a set-top-box device. This may include generating and storing registration data representative of the multi-screen display relationship. Registration facility 104 may store such data as registration data 114 in data storage facility 112. Registration data 114 may include any data representative of one or more multi-screen display relationships between computing devices. Registration data 114 may be used to determine a grouping of devices registered to participate in multi-screen casting. Accordingly, registration data 114 may be used to determine one or more devices to which a graphical user interface display is to be cast.

In certain examples, a multi-screen display relationship may be established by registration facility 104 in response to user input indicating a request to register two or more devices to participate in multi-screen casting. In addition, in some examples, a user credential to register the devices to participate in multi-screen casting may be authenticated before the multi-screen display relationship is established. The authentication of the user credential may be performed in any suitable way, such as by checking a database of user credentials such as a device and/or user password.

Multi-screen casting facility 106 may be configured to perform one or more of the multi-screen casting operations described herein. In certain embodiments, for example, multi-screen casting facility 106 may be configured to selectively enable and disable a multi-screen display mode, which in some examples may be enabled and disabled in response to user input. When the multi-screen display mode is enabled, multi-screen casting facility 106 may be configured to identify and transmit data associated with a graphical user interface display of a first device (e.g., a mobile device) to one or more other devices (e.g., a second device such as a set-top-box device) for display on a display screen associated with the one or more other devices. When the multi-screen display mode is disabled, multi-screen casting facility 106 may be configured to selectively refrain from identifying and/or transmitting data associated with a graphical user interface display of a first device to one or more other devices for display.

Multi-screen casting facility 106 may be configured to identify data associated with a graphical user interface display of a first device in any suitable way. Such data, which may be referred to as "data content" or "display data," may include any data related to and/or that may affect a graphical user interface display, including, without limitation, graphics data output to a display, graphical user interface rendering data, data input to, processed by, and/or output from a rendering engine and/or layout engine, code that may be interpreted to generate a graphical user interface, Hypertext Markup Language ("HTML") code, formatting data, user input data associated with a graphical user interface, display refresh data, and any other data that is related to and/or that may affect a graphical user interface display. Display data may be temporarily or permanently stored as display data 116 in data storage facility 112.

As mentioned, multi-screen casting facility 106 may be configured to identify display data in any suitable way. As an example, in certain embodiments, multi-screen casting facility 106 may be configured to identify display data by tracking data used to generate a graphical user interface display, such as data input to, processed by, and/or output from a rendering engine and/or layout engine (e.g., a rendering engine of a web or e-mail browser). As another example, in certain embodiments, multi-screen casting facility 106 may be configured to identify display data by tracking data requested by and/or transmitted to a device such as a display device or mobile device. To illustrate, a web browser running on a mobile device may transmit a request for data to a server, which may be configured to obtain and transmit the requested data to the mobile device. The request to access data may be detected and the requested and/or transmitted data identified as display data (e.g., data associated with a web browser or other application that generates a graphical user interface for display) by multi-screen casting facility 106. In some examples, the identification may be made by determining that a request for data and/or the requested data is associated with a particular application (e.g., a browser) running on the mobile device. For example, HTML code requested by and/or transmitted to a mobile device may be identified as display data associated with a graphical user interface display of the mobile device. These examples are illustrative only. Other ways of identifying display data may be employed by multi-screen casting facility 106 in other embodiments.

Multi-screen casting facility 106 may be configured to transmit, or at least initiate transmission of, the identified data associated with the graphical user interface display of the first device to one or more other devices for display. For example, if a first device comprises a mobile device and a second device comprises a set-top-box device, multi-screen casting facility 106 may initiate transmission of data identified as associated with a graphical user interface display of the mobile device to the set-top-box device for display by a display device associated with the set-top-box device.

Display data may be transmitted to a second device (e.g., a set-top-box device) in any suitable way and using any suitable connection(s). For example, display data associated with a graphical user interface display of a mobile device may be transmitted to a set-top-box device by way of a direct connection between the mobile device and the set-top-box device (e.g., a local peer-to-peer wireless network connection such as a Bluetooth connection), a local wireless network (e.g., a local Wi-Fi network), a wireless data network, an optical network, a subscriber television network, an Internet Protocol ("IP") based network, a combination of a wireless data network and a subscriber television network (e.g., a combination of a mobile phone wireless data network and a subscriber television network), an IP backchannel to the set-top-box device (e.g., an IP backchannel of a subscriber television network), a combination or sub-combination of any of the above, and any other connection(s) suitable for carrying display data to the set-top-box device. Exemplary connections by which display data may be transmitted to a set-top-box device are described further below with reference to FIGS. 2-5.

Data conversion facility 108 may be configured to convert display data associated with a graphical user interface display from one format to another. For example, data conversion facility 108 may be configured to convert display data from a format suitable for display by a mobile device to a different format that is more suitable for display by a display device associated with a set-top-box device. In certain embodiments, for example, data conversion facility 108 may be configured to convert display data in the form of HTML code to image-format data (e.g., a set of one or more image files such as JPEG files) before the display data is transmitted to a set-top-box device. Such conversion may be especially beneficial when the set-top-box device lacks resources to run a full web browser and/or to interpret HTML code but is able to process image-format data for display.

In certain embodiments, the conversion may include transcoding data. For example, an attachment to an e-mail message to be included in a graphical user interface display may be transcoded from a first format to another format. To illustrate, an attachment to an e-mail message may be transcoded from a Microsoft Word or PowerPoint format to image-format data to allow the attachment to be processed by a set-top-box device for display.

User interface facility 110 may be configured to provide one or more user interfaces configured to facilitate user interaction with system 100. For example, user interface facility 110 may provide a user interface through which one or more functions, options, features, and/or tools may be provided to a user and through which user input may be received. In certain embodiments, user interface facility 110 may be configured to provide one or more registration tools and/or interfaces for use by a user to request registration of one or more devices for participation in multi-screen casting. Additionally or alternatively, user interface facility 110 may be configured to provide one or more tools for use by a user to request that a multi-screen casting mode be enabled or disabled. Exemplary graphical user interfaces that may be provided by user interface facility 110 are described in more detail further below.

Data storage facility 112 may be configured to maintain registration data 114, display data 116, and/or any other data as may serve a particular application. As mentioned, registration data 114 may include any data representative of one or more multi-screen display relationships between computing devices, and display data 116 may include any data related to and/or that may affect a graphical user interface display.

System 100, including facilities 102-112, may include and/or be implemented by any computer hardware and/or computer-implemented instructions (e.g., software), or combinations of computer-implemented instructions and hardware, configured to perform one or more of the processes described herein. In particular, one or more components of system 100 may be implemented on one physical computing device or may be implemented on more than one physical computing device. Accordingly, system 100 may include any number of computing devices, and may employ any of a number of computer operating systems. In certain embodiments, for example, one or more facilities 102-112 may be implemented by a mobile device, a set-top-box device, one or more server devices, or any combination or sub-combination thereof.

One or more of the processes described herein may be implemented at least in part as instructions executable by one or more computing devices. In general, a processor (e.g., a microprocessor) receives instructions, from a computer-readable medium, (e.g., a memory, etc.), and executes those instructions, thereby performing one or more processes, including one or more of the processes described herein. Such instructions may be stored and/or transmitted using any of a variety of known computer-readable media.

A computer-readable medium (also referred to as a processor-readable medium) includes any medium that participates in providing data (e.g., instructions) that may be read by a computer (e.g., by a processor of a computer). Such a medium may take many forms, including, but not limited to, non-volatile media and/or volatile media. Common forms of computer-readable media include, for example, a floppy disk, flexible disk, hard disk, magnetic tape, any other magnetic medium, a CD-ROM, DVD, any other optical medium, a RAM, a DRAM a PROM, an EPROM, a FLASH-EEPROM, any other memory chip or cartridge, or any other medium from which a computer can read.

FIGS. 2-5 illustrate exemplary implementations of system 100. In certain embodiments, elements of system 100 may include or be implemented by one or more components of the exemplary implementations shown in FIGS. 2-5.

Figure 2:
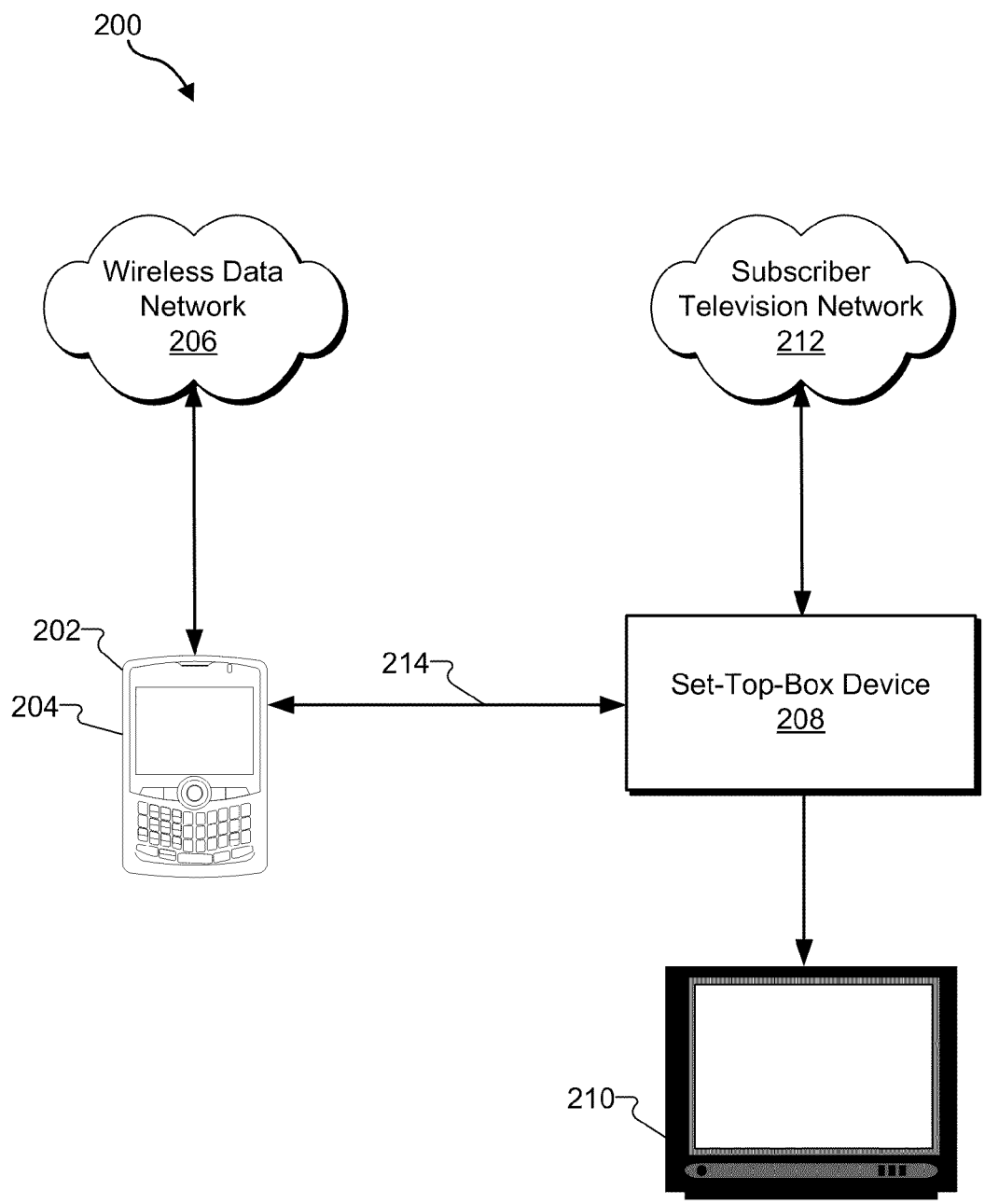
FIGS. 2-5 illustrate exemplary implementations of the system of FIG. 1.

As shown in FIG. 2, an exemplary implementation 200 of system 100 may include a mobile device 202 having a display screen 204 and configured to communicate with one or more other devices by way of a wireless data network 206, including requesting and receiving data content (i.e., display data) over wireless data network 206. In certain embodiments, mobile device 202 may include a mobile phone device, and wireless data network 206 may include a mobile phone wireless data network.

Implementation 200 shown in FIG. 2 may also include a set-top-box device 208 configured to provide output signals representative of one or more images for display on a display device 210 associated with (e.g., connected to) set-top-box device 208. In certain examples, display device 210 includes a television connected to set-top-box device 208. Set-top-box device 208 may be further configured to communicate with one or more other devices by way of a subscriber television network 212, including requesting and/or receiving data representative of media content (e.g., broadcast, multicast, narrowcast, and/or on-demand media content) and/or other data content over subscriber television network 212.

As shown in FIG. 2, mobile device 202 and set-top-box device 208 may be configured to communicate with one another by way of a connection 214, which may comprise a direct connection between mobile device 202 and set-top-box device 208. The direct connection may include, without limitation, a local peer-to-peer wireless connection such as a Bluetooth connection. In implementation 200, display data may be transmitted from mobile device 202 to set-top-box device 208 by way of connection 214.

Figure 3:
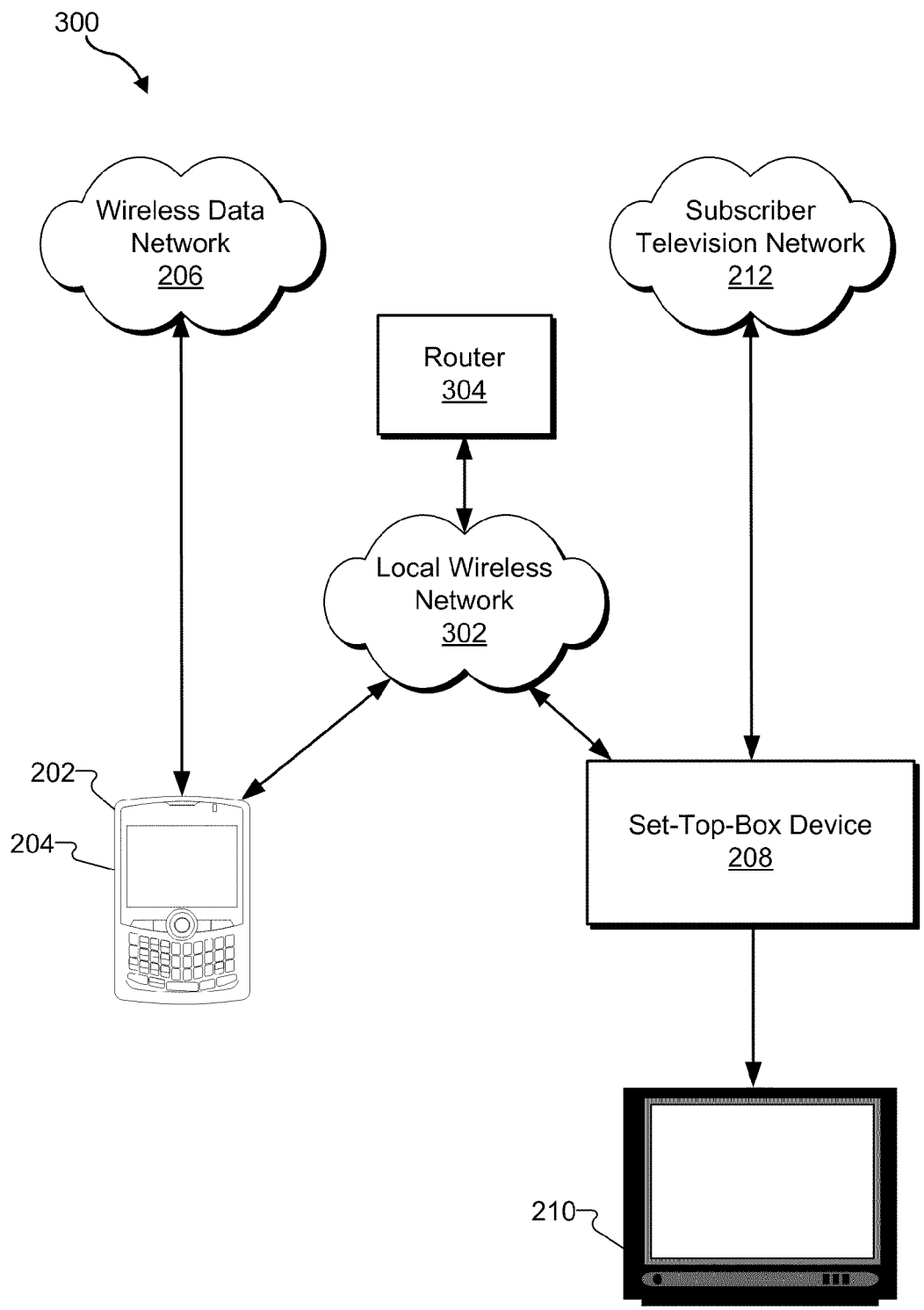

FIG. 3 shows another exemplary implementation 300 of system 100. In implementation 300, mobile device 202 may be configured to communicate with one or more other devices by way of wireless data network 206 and set-top-box device 208 may be configured to communicate with one or more other devices by way of subscriber television network 212 as described above. Set-top-box device 208 may also be configured to communicate directly with display device 210 as described above. In addition, mobile device 202 and set-top-box device 208 may be configured to communicate with one another by way of a local wireless network 302. For example, mobile device 202 and set-top-box device 208 may communicate by way of a router 304, which in certain embodiments may include a Wi-Fi router within a local Wi-Fi network (e.g., a home Wi-Fi network). In implementation 300, display data associated with a graphical user interface display of mobile device 202 may be transmitted to set-top-box device 208 by way of local wireless network 302 and router 304.

Figure 4:
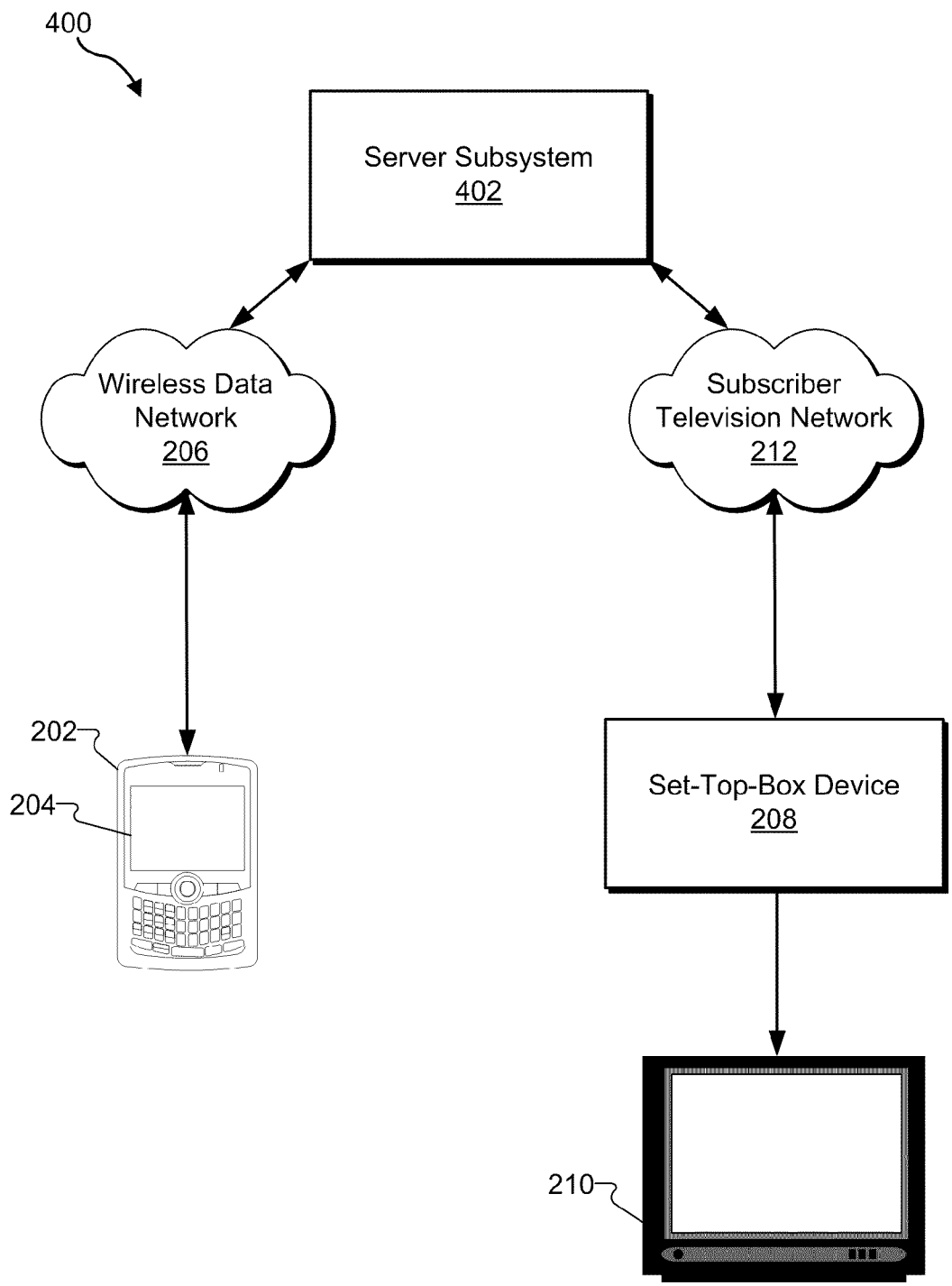

FIG. 4 shows another exemplary implementation 400 of system 100. In implementation 400, mobile device 202 may be configured to communicate with one or more other devices by way of wireless data network 206, and set-top-box device 208 may be configured to communicate and one or more other devices by way of subscriber television network 212 as described above. Set-top-box device 208 may also be configured to communicate directly with display device 210 as described above. In addition, mobile device 202 and set-top-box device 208 may be configured to communicate with one another by way of a server subsystem 402, which may be configured to communicate with mobile device 202 by way of wireless data network 206 and with set-top-box 208 by way of subscriber television network 212. Accordingly, server subsystem 402 may bridge communications transmitted from wireless data network 206 to subscriber television network 212 and vice versa. In implementation 400, display data associated with a graphical user interface display of mobile device 202 may be transmitted to set-top-box device 208 by way of subscriber television network 212 or a combination of wireless data network 206 and subscriber television network 212. For example, server subsystem 402 may transmit display data associated with a graphical user interface display of mobile device 202 to set-top-box device 208 by way of subscriber television network 212 (e.g., by way of an IP backchannel of subscriber television network 212). Server subsystem 402 may comprise one or more server devices (e.g., a proxy server, a web server, an e-mail server, a wireless data network server, a subscriber television network server, etc.) configured to communicate with one another and with one or more other devices by way of wireless data network 206 and/or subscriber television network 212.

The implementations 200, 300, and 400 shown in FIGS. 2-4 are illustrative only. Other implementations of system 100 may be employed in other embodiments. For example, certain alternative implementations may utilize a combination or sub-combination of the exemplary communication connections between mobile device 202 and set-top-box device 208 illustrated in FIGS. 2-4. In at least one alternative implementation, for example, mobile device 202 and set-top-box device 208 may communicate with one another by way of local wireless network 302 and server subsystem 402.

An exemplary application of casting a graphical user interface display of mobile device 202 for display by display device 210 associated with set-top-box device 208 will now be described. The exemplary application is related to casting of display data in conjunction with mobile device 202 browsing for (e.g., requesting and retrieving) data content to be displayed within a browser graphical user interface display (e.g., a web browser interface) of the mobile device 202.

Figure 5:
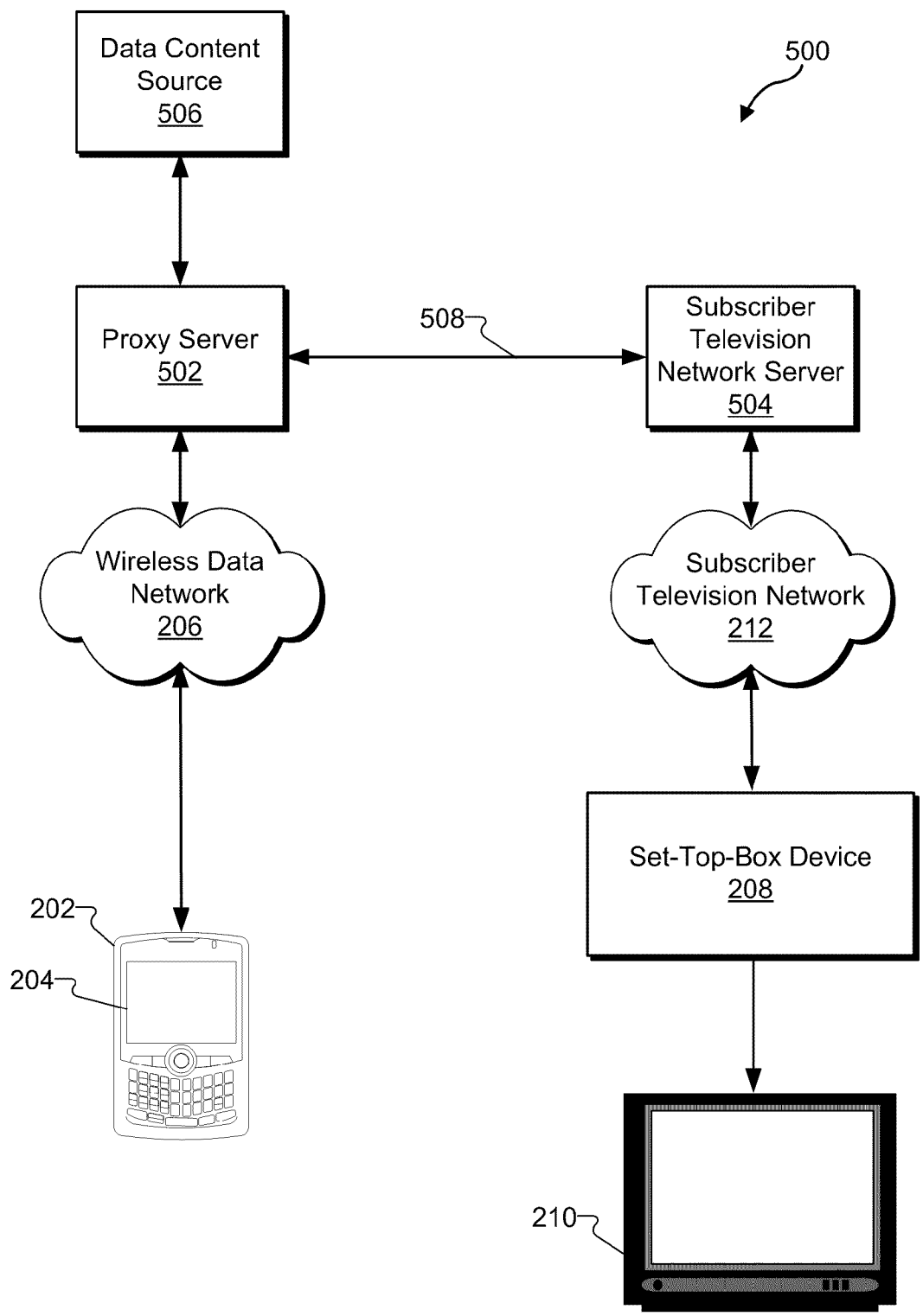

The exemplary application will be described in reference to an exemplary implementation 500 of system 100 shown in FIG. 5. As shown in FIG. 5, implementation 500 may include mobile device 202 configured to communicate by way of wireless data network 206, and set-top-box device 208 configured to communicate with display device 210 and by way of subscriber television network 212 as described above. In addition, implementation 500 may include a proxy server 502, a subscriber television network server 504, and a data content source 506 communicatively coupled as shown.

Proxy server 502 and subscriber television network server 504 may be part of server subsystem 402 shown in FIG. 4 and may form a communication bridge between wireless data network 206 and subscriber television network 212. Proxy server 502 and subscriber television network server 504 may communicate with one another using any suitable communication technologies, including by way of a private or public IP based network connection, which is represented as connection 508 in FIG. 5.

Subscriber television network server 504 may include one or more server devices 504 configured to communicate with set-top-box device 208 by way of subscriber television network 212. In certain embodiments, communications between subscriber television network server 504 and set-top-box device 208 may be transmitted and received over an IP backchannel of subscriber television network 212.

Data content source 506 may comprise one or more computing devices configured to provide data content. For example, data content source 506 may include one or more server devices such as a web server, e-mail server, data content server, etc.

Before describing operations associated with the exemplary application of casting a graphical user interface display of mobile device 202 for display by display device 210 associated with set-top-box device 208, exemplary components of mobile device 202, proxy server 502, and set-top-box device 208 according to an exemplary implementation will now be described.

Figure 6:
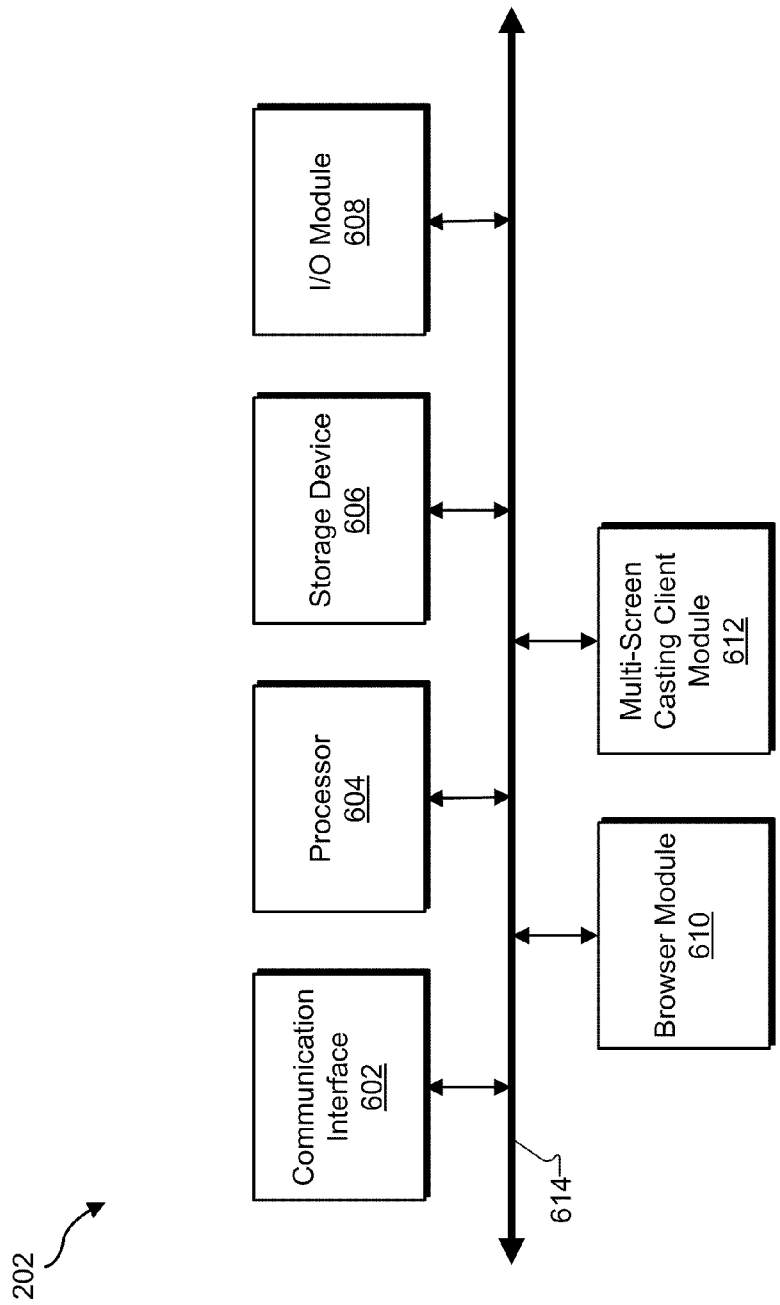
FIG. 6 illustrates exemplary components of a mobile device.

FIG. 6 illustrates exemplary components of mobile device 202. In certain embodiments, one or more components of system 100 may be implemented by mobile device 202. As shown in FIG. 6, mobile device 202 may include a communication interface 602, a processor 604, a storage device 606, an input/output ("I/O") module 608, a browser module 610, and a multi-screen casting client module 612 communicatively coupled one to another via a communication infrastructure 614. The components of mobile device 202 may communicate with one another, including sending data to and receiving data from one another, using any suitable communication technologies. Moreover, the components of mobile device 202 may be implemented on any mobile computing device such as a mobile phone device. Components of the mobile device 202 shown in FIG. 6 will now be described in additional detail.

Communication interface 602 may be configured to communicate with one or more computing devices. In particular, communication interface 602 may be configured to transmit and/or receive communication signals and/or data to/from one or more computing devices by way of wireless data network 206. Communication interface 602 may include any wireless network interface (such as a radio frequency transceiver) configured to support communications over wireless data network.

Processor 604 generally represents any type or form of processing unit capable of processing data or interpreting, executing, and/or directing execution of one or more of the instructions, processes, and/or operations described herein. Processor 604 may direct execution of operations in accordance with one or more applications or other computer-executable instructions such as may be stored in storage device 606 or another computer-readable medium.

Storage device 606 may include one or more data storage media, devices, or configurations and may employ any type, form, and combination of data storage media and/or device. For example, storage device 606 may include, but is not limited to, a hard drive, network drive, flash drive, magnetic disc, optical disc, random access memory ("RAM"), dynamic RAM ("DRAM"), other non-volatile and/or volatile data storage units, or a combination or sub-combination thereof. Electronic data, including data described herein, may be temporarily and/or permanently stored in storage device 606.

I/O module 608 may be configured to receive user input and provide user output and may include any hardware, firmware, software, or combination thereof supportive of input and output capabilities. For example, I/O module 608 may include one or more devices for capturing user input, including, but not limited to, a microphone, a keyboard or keypad, a touch screen component (e.g., touch screen display), a trackball, a data receiver (e.g., an RF or infrared receiver), and/or one or more input buttons.

I/O module 608 may include one or more devices for presenting output to a user, including, but not limited to, a graphics engine (e.g., a layout or rendering engine), a display (e.g., display screen 204), one or more output drivers (e.g., display drivers), one or more audio speakers, one or more audio drivers, and a data transmitter. I/O module 608 may be configured to provide graphical data to display screen 204 for presentation to a user. The graphical data may be representative of one or more graphical user interface displays.

Browser module 610 may be configured to request and receive data content from an external source such as data content source 506. In addition, browser module 610 may generate a graphical user interface such as a browser interface for display. The graphical user interface may include graphics representative of data content requested and received from an external source. In certain embodiments, browser module 610 may include a web browser and/or an e-mail application, for example.

Multi-screen casting client module 612 (or simply "client module 612") may be configured to perform and/or initiate performance of one or more client-side operations of system 100. For example, client module 612 may be configured to perform one or more of the client-side multi-screen registration, casting, data conversion, and/or user interface operations described herein, including determining whether a multi-screen casting mode is enabled and generated requests to provide data content to devices having a registered multi-screen display relationship with mobile device 202, for example.

Figure 7:
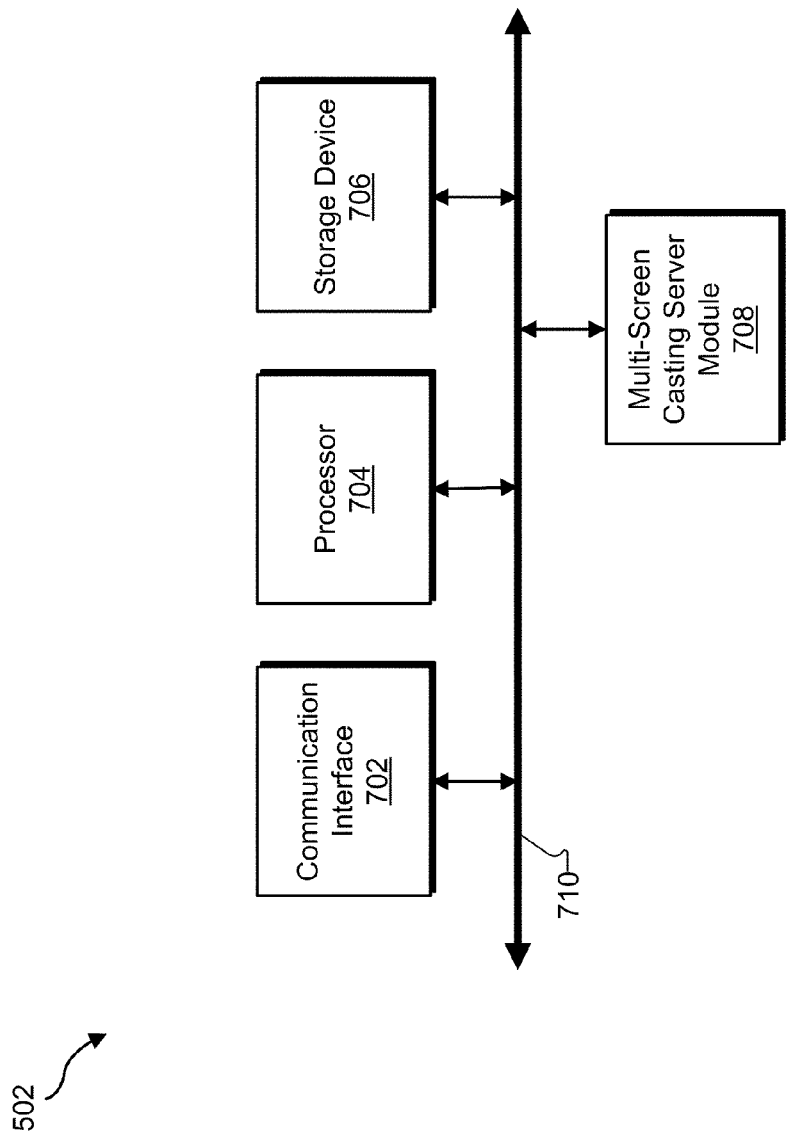
FIG. 7 illustrates exemplary components of a proxy server.

FIG. 7 illustrates exemplary components of proxy server 502. In certain embodiments, one or more components of system 100 may be implemented by proxy server 502. As shown in FIG. 7, proxy server 502 may include a communication interface 702, a processor 704, a storage device 706, and a multi-screen casting server module 708 communicatively coupled one to another via a communication infrastructure 710. The components of proxy server 502 may communicate with one another, including sending data to and receiving data from one another, using any suitable communication technologies. Moreover, the components of proxy server 502 may be implemented by any suitable computing device. Components of the proxy server 502 shown in FIG. 7 will now be described in additional detail.

Communication interface 702 may be configured to communicate with one or more computing devices. In particular, communication interface 702 may be configured to transmit and/or receive communication signals and/or data to/from one or more computing devices by way of wireless data network 206. For example, communication interface 702 may communicate with mobile device 202 by way of wireless data network 206. In addition, communication interface 702 may communicate with data content source 506 and subscriber television network server 504 using any suitable data communication technologies. Examples of communication interface 402 may include, without limitation, a wired network interface (such as a network interface card), a wireless network interface (such as a wireless network interface card and/or a radio frequency transceiver), a modem, an optical fiber network terminal, and any other suitable interface.

Processor 704 generally represents any type or form of processing unit capable of processing data or interpreting, executing, and/or directing execution of one or more of the instructions, processes, and/or operations described herein. Processor 704 may direct execution of operations in accordance with one or more applications or other computer-executable instructions such as may be stored in storage device 706 or another computer-readable medium.

Storage device 706 may include one or more data storage media, devices, or configurations and may employ any type, form, and combination of data storage media and/or device. For example, storage device 706 may include, but is not limited to, a hard drive, network drive, flash drive, magnetic disc, optical disc, random access memory ("RAM"), dynamic RAM ("DRAM"), other non-volatile and/or volatile data storage units, or a combination or sub-combination thereof. Electronic data, including data described herein, may be temporarily and/or permanently stored in storage device 706.

Multi-screen casting server module 708 (or simply "server module 708") may be configured to perform and/or initiate performance of one or more server-side operations of system 100. For example, server module 708 may be configured to perform one or more of the server-side multi-screen registration, casting, data conversion, and/or user interface operations described herein.

Figure 8:
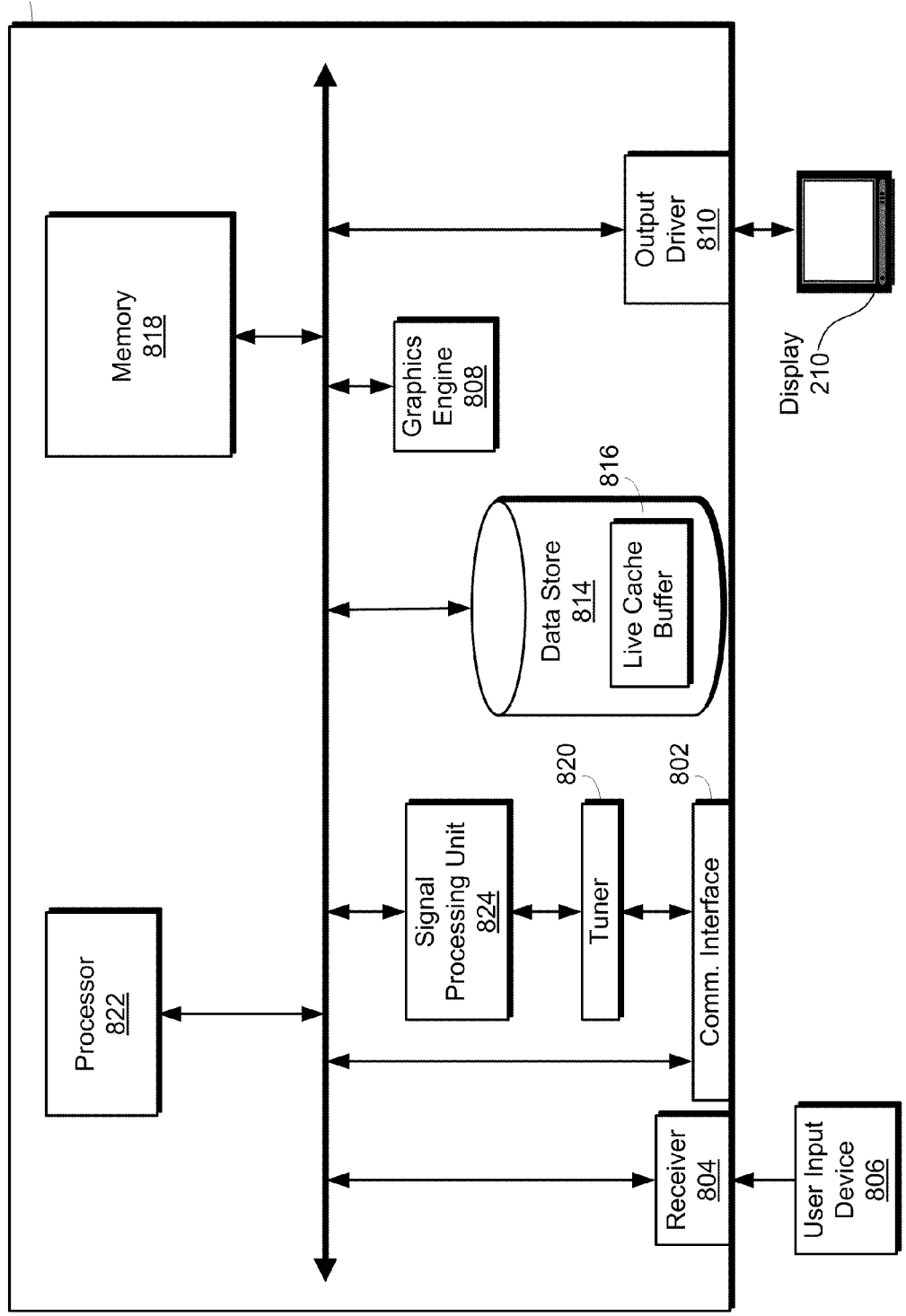
FIG. 8 illustrates exemplary components of a set-top-box device.

FIG. 8 illustrates exemplary components of set-top-box device 208 (or simply "device 208"). Device 208 may include one or more of the components of system 100 and may be configured to perform one or more of the set-top-box device processes and/or operations described herein.

As shown in FIG. 8, device 208 may include a communication interface 802, which may be configured to receive media content and/or other data (e.g., media content metadata, program guide data, display data, etc.) in any acceptable format by way of subscriber television network 212. Communication interface 802 may include any device, logic, and/or other technologies suitable for receiving signals, media content, and/or data. Communication interface 802 may be configured to interface with any suitable communication media, protocols, and formats, including any of those mentioned herein.

Device 208 may also include a receiver 804 configured to receive user input signals from a user input device 806. User input device 806 may include, for example, a remote control device or any other suitable input device and may be configured to communicate with receiver 804 via a wireless link, electrical connection, or any other suitable communication link.

Device 208 may include a graphics engine 808 and an output driver 810. Graphics engine 808 may be configured to generate graphics to be provided to output driver 810, which may be configured to interface with or drive display 210. Output driver 810 may provide output signals to display 210, the output signals including graphical data (e.g., graphical data representative of media content and/or a graphical user interface) generated by graphics engine 808 and to be presented by display 210 for experiencing by a user 108. Graphics engine 808 and output driver 810 may include any combination of hardware, software, and/or firmware as may serve a particular application.

Data store 814 may include one or more data storage media, devices, or configurations and may employ any type, form, and combination of storage media. For example, data store 814 may include, but is not limited to, a hard drive, network drive, flash drive, magnetic disc, optical disc, or other non-volatile storage unit. Electronic data, including data disclosed herein, may be temporarily and/or permanently stored in data store 814. Data store 814 is shown to be included within device 208 in FIG. 8 for illustrative purposes only. It will be understood that data store 814 may additionally or alternatively be located external to device 208.

Data store 814 may include one or more live cache buffers 816. Live cache buffer 816 may additionally or alternatively reside in memory 818 or in a storage device external to device 208. In some examples, media content data may be temporarily stored in live cache buffer 816 to facilitate viewing and/or recording of the media content.

Device 208 may include memory 818. Memory 818 may include, but is not limited to, FLASH memory, random access memory ("RAM"), dynamic RAM ("DRAM"), other suitable computer-readable media, or any combination or sub-combination thereof. In some examples, data representative of one or more applications (e.g., widgets) configured to run on or otherwise be executed by device 208 may reside in memory 818. For example, a multi-screen casting widget may be implemented in memory 818 or data store 814 of device 208 and configured to direct device 208 to perform one or more of the multi-screen casting operations described herein. For instance, the widget may open and maintain a data communication tunnel through which multi-screen casting display data (e.g., image-format data) may be received and incorporated into a display of display device 210.

Device 208 may include one or more tuners 820. Tuner 820 may be configured to selectively receive media content carried on a particular media content carrier channel such that the media content may be processed by device 208. In some examples, media content received by tuner 820 may be temporarily buffered, or stored, in the live cache buffer 816. If there are multiple tuners 820, there may be a live cache buffer 816 corresponding to each of the tuners 820.

While tuner 820 may be used to receive certain media content carrying signals transmitted over subscriber television network 212, device 208 may be configured to receive other types of media content signals (including media content signals and/or program guide data signals) without using a tuner. For example, digital streams of data packets (e.g., IP-based data packets) may be received without using a tuner. For such types of media content signals, communication interface 802 may receive and forward the signals directly to other components of device 208 (e.g., processor 822 or signal processing unit 824, described in more detail below) without the signals going through tuner 820. For an IP-based signal, for example, signal processing unit 824 may function as an IP receiver.

In certain embodiments, other data may be received by communication interface 802 and forwarded to one or more components of device 208 without going through tuner 820. For example, communication interface 802 may be configured to send and receive data (e.g., display data such as image data representative of a graphical user interface display) by way of an IP backchannel of subscriber television network 206.

Device 208 may include at least one processor, such as processor 822, configured to control and/or perform one or more operations of device 208. Device 208 may also include a signal processing unit 824 configured to process incoming media content. Signal processing unit 824 may be configured, for example, to demodulate and parse encoded digital media content. In some examples, device 208 may include one or more signal processing units 824 corresponding to each of the tuners 820.

Exemplary operations of one or more components shown in FIG. 5 will now be described in the context of the aforementioned exemplary application of casting a graphical user interface display of mobile device 202 for display by display device 210 associated with set-top-box device 208.

Mobile device 202 and set-top-box device 208 may be registered to participate in a multi-screen display casting group. This may be accomplished by establishing a multi-screen display relationship between mobile device 202 and set-top-box device 208 as described above.

Figure 9:
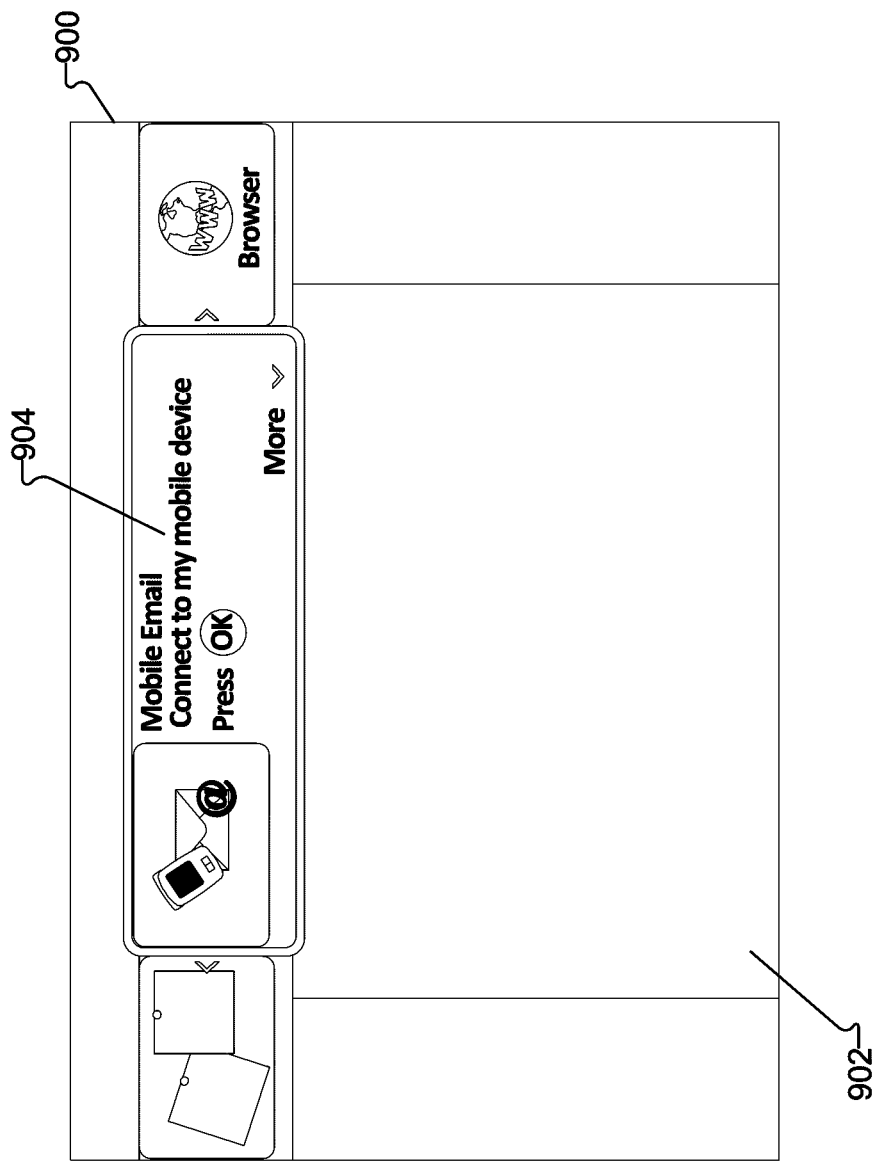
FIGS. 9-11 illustrate exemplary views displayed within a graphical user interface.
Figure 10:
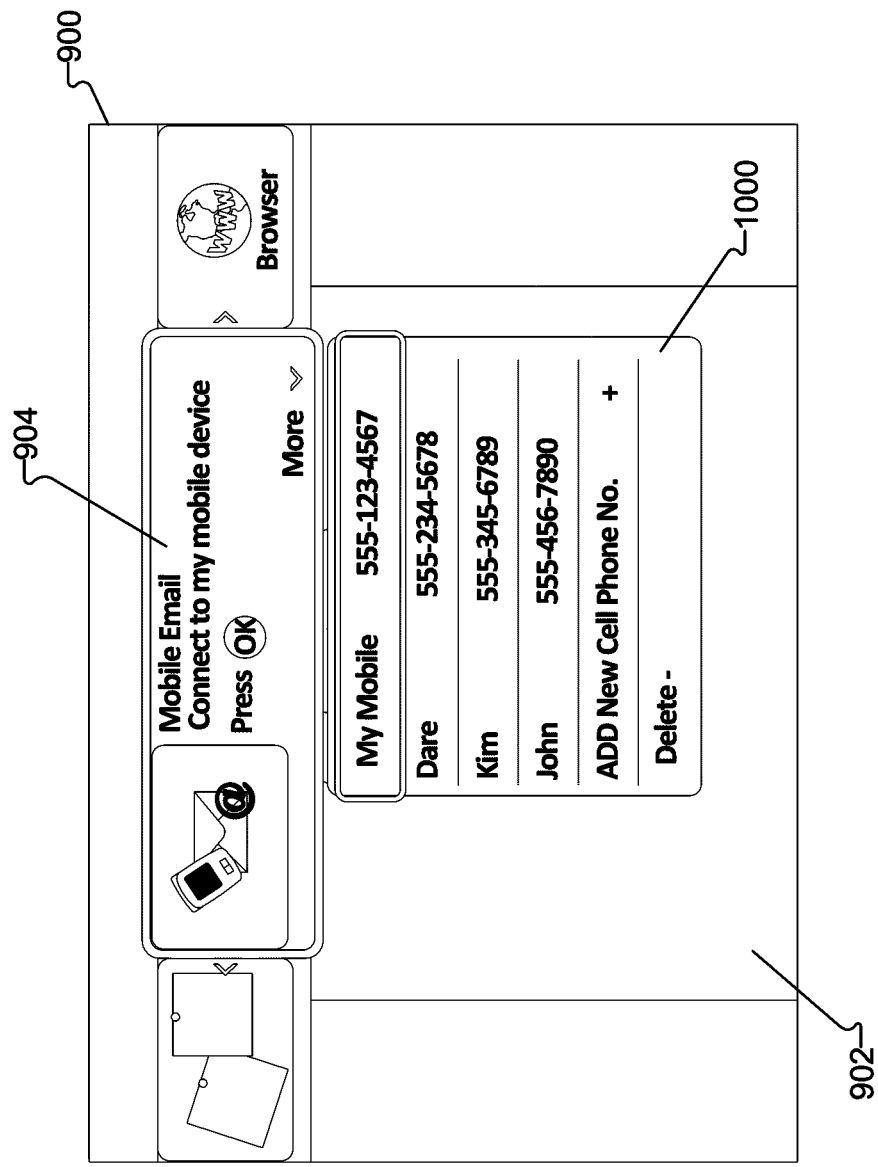
Figure 11:
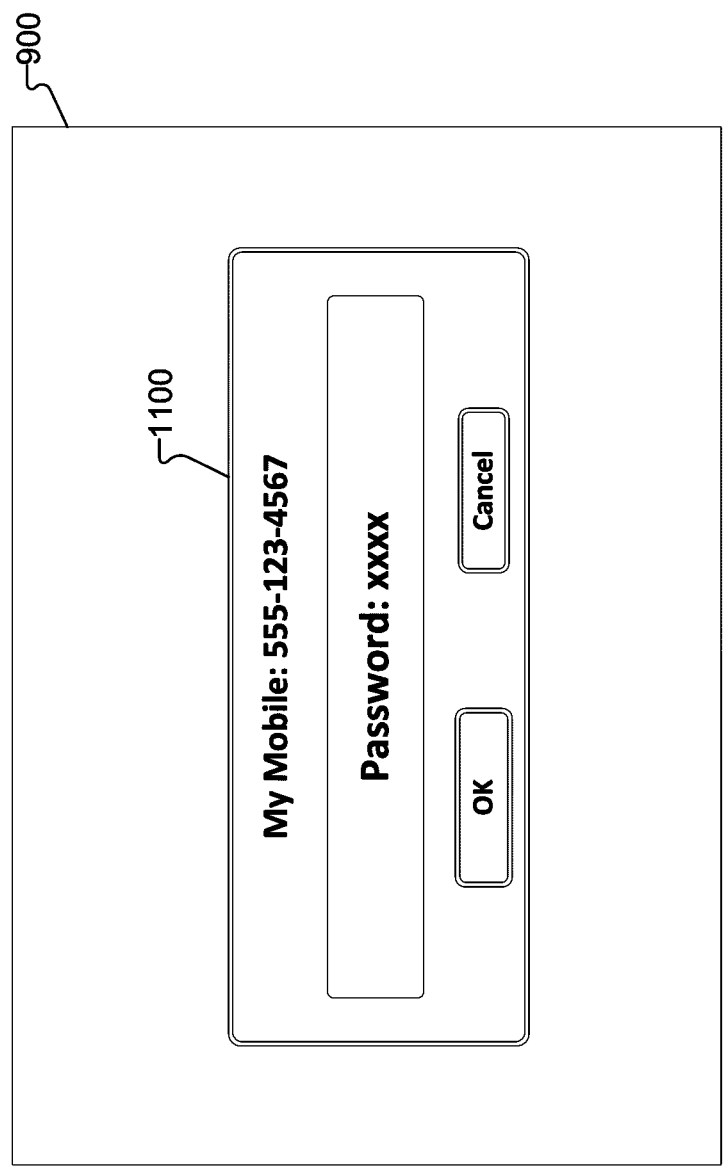

As an example, mobile device 202 and/or set-top-box device 208 may be configured to provide a user interface through which a user may request registration of mobile device 202 and set-top-box device 208 in a multi-screen display casting group. To illustrate, FIGS. 9-11 show an exemplary graphical user interface 900 that may be provided by set-top-box device 208 for display on display device 210. Graphical user interface 900 may be configured to facilitate registration of set-top-box device 210 with one or more other devices for multi-screen display casting.

As shown in FIG. 9, graphical user interface 900 may include a video pane 902 within which a presentation of a media content program may be displayed. In addition, graphical user interface 900 may include a selectable option 904 to connect set-top-box device 208 to another device such as mobile device 202. When a user selects option 904, a pop-up window 1000 including a menu list of one or more selectable options associated with one or more devices may be displayed in graphical user interface 900 as shown in FIG. 10. A user may select from the menu list to indicate a device to which set-top-box device 208 should be connected. For instance, the user may indicate that set-top-box device 208 be connected to mobile device 202 by selecting a "my mobile" option from the menu list.

In response to a user selection of the "my mobile" option, user credentials to register mobile device 202 to set-top-box device 208 may be requested. For example, a password associated with mobile device 202 may be requested of the user. FIG. 11 illustrates a user interface request 1100 for a password to access mobile device 202 as may be presented in graphical user interface 900. The user of set-top-box device 208 may enter a password, which may be used to determine whether the user has permission to register mobile device 202 with set-top-box device 208 for multi-screen display casting.

While an example of set-top-box device 208 providing user interface tools configured to facilitate registration of devices for multi-screen display casting has been described, the example is illustrative only. Other tools may be provided by set-top-box device 208, mobile device 202, and/or one or more other devices to facilitate registration of one or more devices for multi-screen display casting. For example, a user of mobile device 202 may utilize mobile device 202 to access and use one or more user interface tools to register mobile device 202 with one or more other devices such as set-top-box device 208.

In response to receipt of user input requesting registration of mobile device 202 and set-top-box device 208 for multi-screen display casting, data representative of a multi-screen display relationship between mobile device 202 and set-top-box device 208 may be generated, stored, maintained, and used in one or more multi-screen display casting operations. Such registration data 114 may be stored and maintained in any suitable location, including within data storage facility 112, storage device 606 of mobile device 202, storage device 706 of proxy server 502, and/or data store 814 of set-top-box device 208, for example. For instance, registration data may be stored in storage device 606 of mobile device 202 and may be used by mobile device 202 to identify set-top-box device 208 as a registered multi-screen display casting partner of mobile device 202. Accordingly, when a user of set-top-box device 208 requests registration of set-top-box device 208 with mobile device 202, data representative of the request (and authentication information) may be transmitted from set-top-box device 208 to mobile device 202 by way of subscriber television network 212, subscriber television network server 504, proxy server 502, and wireless data network 206. The request may be processed and registration data 114 generated and stored in storage device 606 of mobile device 202. The registration data 114 may include information that may be used to communicate with set-top-box device 208.

In certain embodiments, mobile device 202 and/or set-top-box device 208 may be configured to provide a user interface through which a user may selectively enable and disable a multi-screen display casting mode. Accordingly, a user of mobile device 202 and/or set-top-box device 208 may be able to provide user input to enable or disable a multi-screen display casting mode as desired.

With the multi-screen display casting mode enabled, one or more components shown in FIG. 5 may be configured to perform multi-screen casting operations. To illustrate, a user of mobile device 202 may access and utilize browser module 610 of mobile device 202 to provide input instructing mobile device 202 to browse for data content by way of wireless data network 206. In response to the user input, browser module 610 may initiate transmission of a request for the data content, which request may be transmitted by mobile device 202 by way of wireless data network 206. The request may be received and processed by proxy server 502 to retrieve the requested data content. For example, proxy server 502 may forward the request to data content source 506 and receive the requested data content from data content source 506. Proxy server 502 may optimize the retrieved data content for display by display device 210 and transmit the optimized data content to mobile device 202 by way of wireless data network 206. Mobile device 202 may process the received data content to generate and display a graphical user interface display on display screen 204 of mobile device 202.

In addition, client module 612 of mobile device 202 may identify the requested data content as being associated with a graphical user interface display of mobile device 202. This may be accomplished in any suitable way, including in any of the ways described above. As an example, client module 612 may be configured to identify requests generated by browser module 610 as being associated with a graphical user interface display (e.g., a browser interface) of mobile device 202.

Client module 612 of mobile device 202 may determine whether a multi-screen display mode is enabled or disabled. If the multi-screen display mode is enabled, client module 612 may instruct mobile device 202 to generate and transmit a request that the data content requested by browser module 610 also be provided to one or more devices registered to participate with mobile device 202 in multi-screen display casting. For example, mobile device 202 may insert additional information (e.g., a multi-screen casting parameter value) in the request for data content. In particular, client module 612 of mobile device 202 may insert data requesting that an additional set of the requested data content be transmitted to set-top-box device 208 for display on display device 210.

Proxy server 502 may receive, process, and respond to the request for data content transmitted by mobile device 202. This may include proxy server 502 retrieving the requested data content from data content source 506, optimizing the retrieved data content for display on display screen 204 of mobile device 202, and transmitting the optimized data content to mobile device 202 for processing and display by mobile device 202. The optimization of data content for display by mobile device 202 may include any optimizations of data that may be helpful for displaying the data with a mobile device that has limited processing resources and/or a relatively small display screen.

In addition, proxy server 502 may detect (e.g., within the request for data content) a request that the data content also be provided to one or more other devices. For example, server module 708 may detect that the request for data content includes a request that a set of the requested data content be provided to set-top-box device 208. In response, proxy server 502 may optimize and transmit a second set of the data content for display by display device 210 associated with set-top-box device 208. The optimization of data content for display by display device 210 may include any suitable optimizations of data for processing by set-top-box device 208 and/or for display by display device 210. In certain embodiments, for example, optimization of the second set of data content may include converting the retrieved data content from one format to another, such as from HTML code to image-format data (e.g., a set of image files).

In certain embodiments, the data content may be optimized in distinct ways for display on display screen 204 of mobile device 202 and for display on display device 210 associated with set-top-box device 208. For example, the requested data content may comprise HTML code retrieved from data content source 506. Proxy server 502 may optimize the HTML code for display by a mobile device before transmission of the optimized HTML code to mobile device 202, which may interpret the HTML code and generate a graphical user interface display based on the HTML code. In addition, the proxy server 502 may optimize the HTML code for display by display device 210 associated with set-top-box device 208 by converting the HTML code to image-format data (e.g., a set of one or more image files) that may be processed by set-top-box device 208 to generate an image-format-based representation of the data content that may be displayed by display device 210.

Proxy server 502 may transmit optimized display data such as a set of image files to set-top-box device 208 for processing and display by display device 210. In certain examples, the display data may be transmitted from proxy server 502 to set-top-box device 208 by way of subscriber television network server 504 and subscriber television network 212 as described above. Subscriber television network server 504 may be configured with a mini-browser server module configured to forward the display data to set-top-box device 208 by way of an IP backchannel of subscriber television network 212.

In the above-described manner, system 100 may leverage certain functionalities of mobile device 202, such as browsing capabilities, to generate a graphical user interface display (e.g., an image-format-based representation of a graphical user interface display) on display device 210 associated with set-top-box device 208. Accordingly, a user of mobile device 202 and set-top-box device 208 may be able to view a graphical user interface display on multiple display screens including display screen 204 of mobile device 202 and on a display screen of display device 210 associated with set-top-box device 208.

Figure 12:
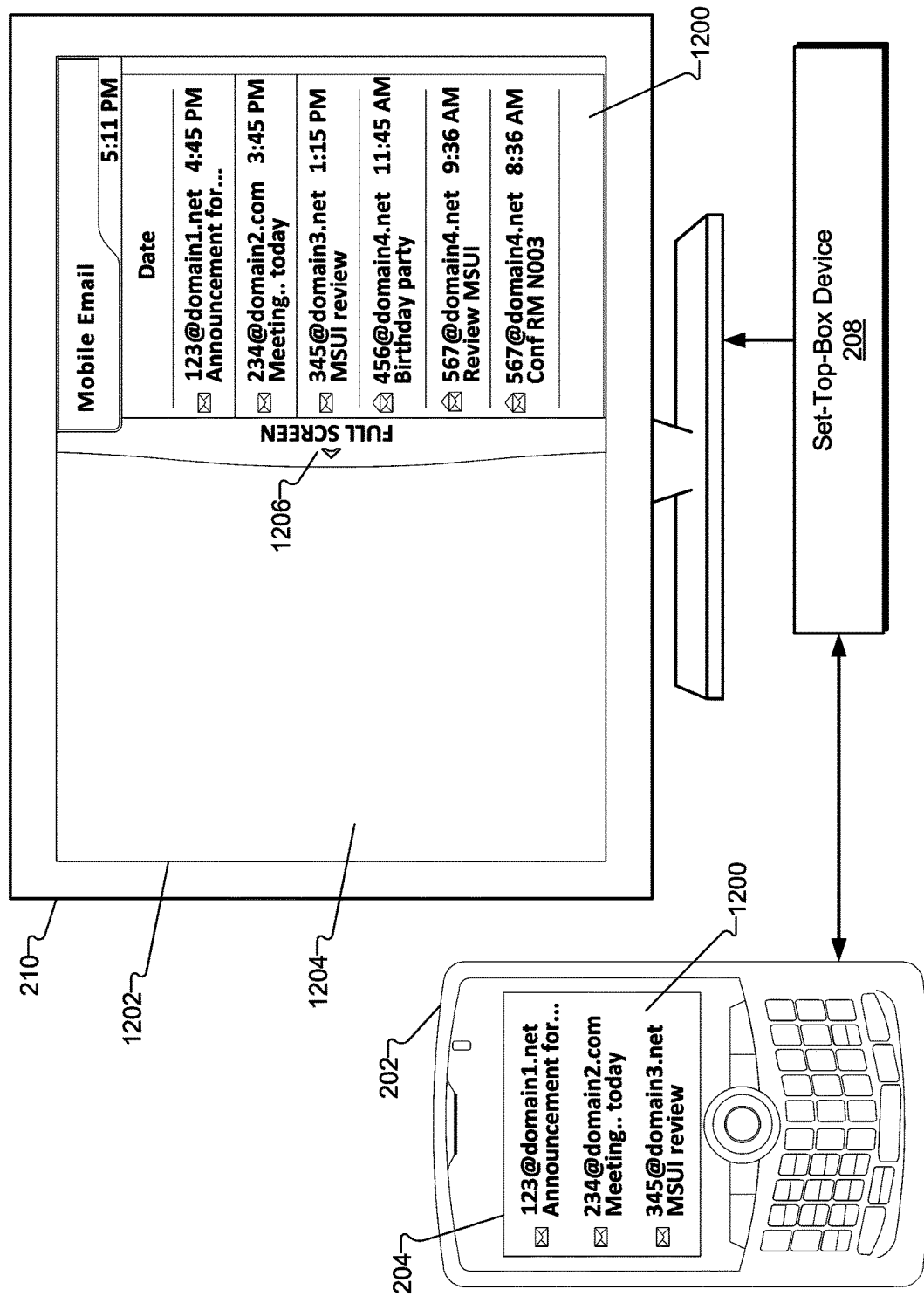
FIG. 12 illustrates an exemplary concurrent display of a graphical user interface by a mobile device and of a representation of the graphical user interface by a display device associated with a set-top-box device.

To illustrate, FIG. 12 shows a graphical user interface 1200 displayed on display screen 204 of mobile device 202 and on a display screen 1202 of display device 204 associated with set-top-box device 208. As shown, certain differences may exist between the display of graphical user interface 1200 by mobile device 202 and the display of graphical user interface 1200 by display device 210 associated with set-top-box device 208. For example, more information (e.g., a larger number of e-mail messages and/or more detailed information for each of the e-mail messages) may be displayed by display device 210 than by mobile device 202 due at least in part to a comparatively larger screen size and/or higher resolution offered by display device 210. In certain examples, the graphical user interface 1200 displayed by display device 210 may comprise an image-format-based representation of the graphical user interface 1200 displayed by mobile device 202.

In the example shown in FIG. 12, in addition to a display of graphical user interface 1200 on a portion of display screen 1202, another portion of the display screen 1202 may be dedicated to a video pane 1204 within which a presentation of a media content program may be displayed. A user of set-top-box device 208 may choose to toggle between the split-screen display shown on display screen 1202 of display device 210 and a full-screen view of graphical user interface 1200 on display screen 1202. The display may be toggled in this manner in response to a user selection of a selectable view toggle option 1206 indicated on display screen 1202. Mobile device 202 and set-top-box device 208 may communicate directly or indirectly in any of the ways described above to cast graphical user interface 1200 for display by mobile device 202 and display device 210 associated with set-top-box device 208.

As a user of mobile device 202 utilizes mobile device 202 to control a browsing session, updates made to the graphical user interface display of mobile device 202 may be cast for display by display device 210 associated with set-top-box device 208. For example, each time proxy server 502 receives a request from mobile device 202 for data content when a multi-screen display casting mode is enabled, proxy server 502 may optimize and transmit data representative of the data content to set-top-box device 208 for display by display device 210.

In addition, mobile device 202 may be configured to detect any other display data and/or display event that affects and/or will affect a display on display screen 204 of mobile device 202. The detection may be performed in any of the ways described above. For example, user input that may affect a display on display screen 204 of mobile device 202 may be detected. Mobile device 202 and/or proxy server 502 may be configured to perform one or more operations configured to translate the user input and/or other display event into display data that may be transmitted to set-top-box device 208 such that a display presented by display device 210 associated with set-top-box device 208 may coincide with a display presented by mobile device 202. In certain embodiments, this may include transmitting data representative of text strings (e.g., image-format-based representations of text strings) input by a user of mobile device 202 in a graphical user interface display of mobile device 202 from mobile device 202 to set-top-box device 208 for display by display device 210.

Figure 13:
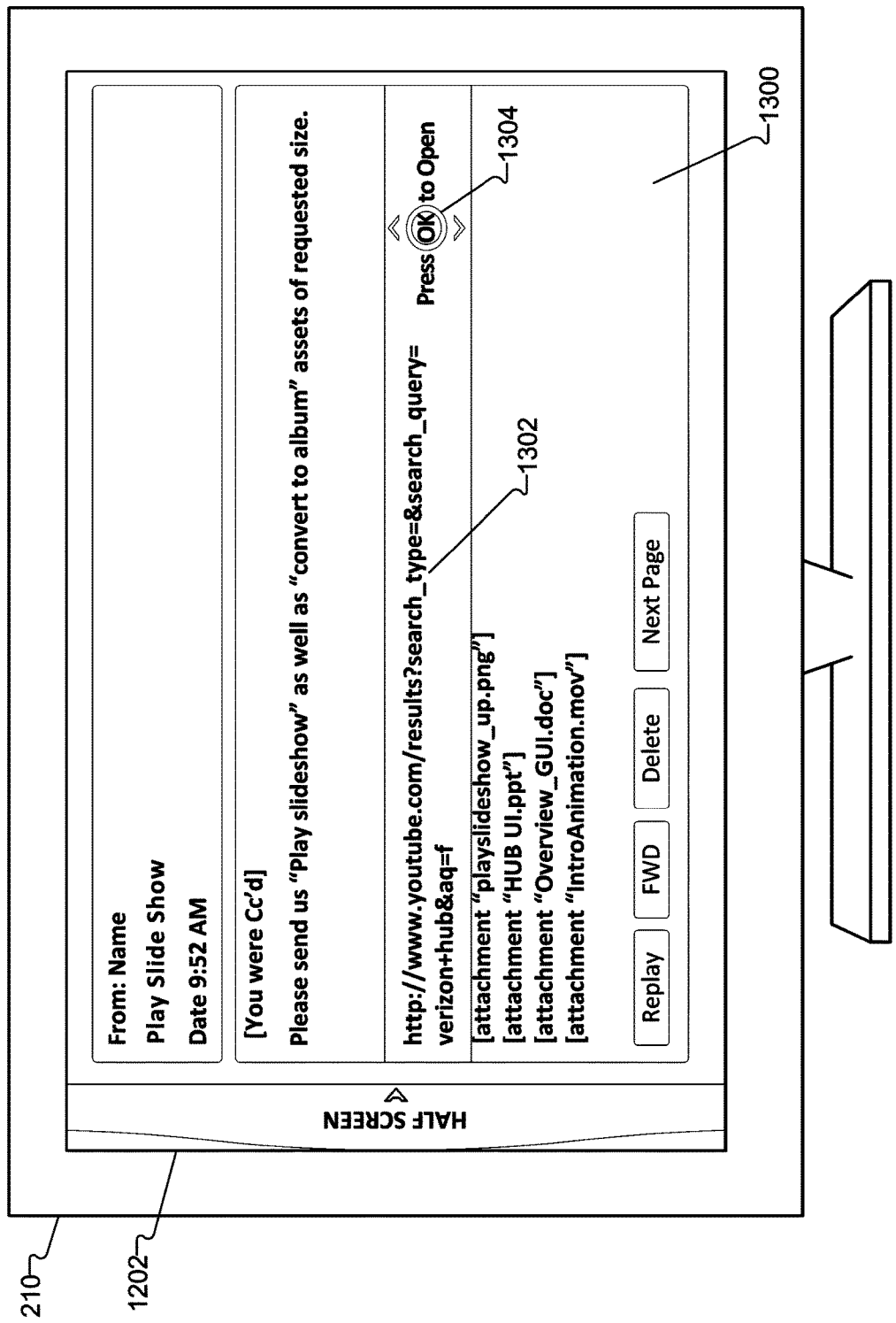
FIGS. 13-14 illustrate exemplary representations of graphical user interfaces display by a display device associated with a set-top-box device.

To illustrate, a user of mobile device 202 may provide input selecting one of the e-mail messages displayed in graphical user interface 1200 of FIG. 12. Mobile device 202 may request, receive, and display data content corresponding to the selected e-mail message. In addition, data content corresponding to the selected e-mail message may be optimized and transmitted from the proxy server 502 to set-top-box device 208 for display by display device 210. FIG. 13 illustrates a graphical user interface 1300 displayed on display screen 1202 of display device 210. As shown, data content corresponding to an e-mail message is displayed therein. Graphical user interface 1300 shown in FIG. 13 may coincide with a graphical user interface display of mobile device 202.

Figure 14:
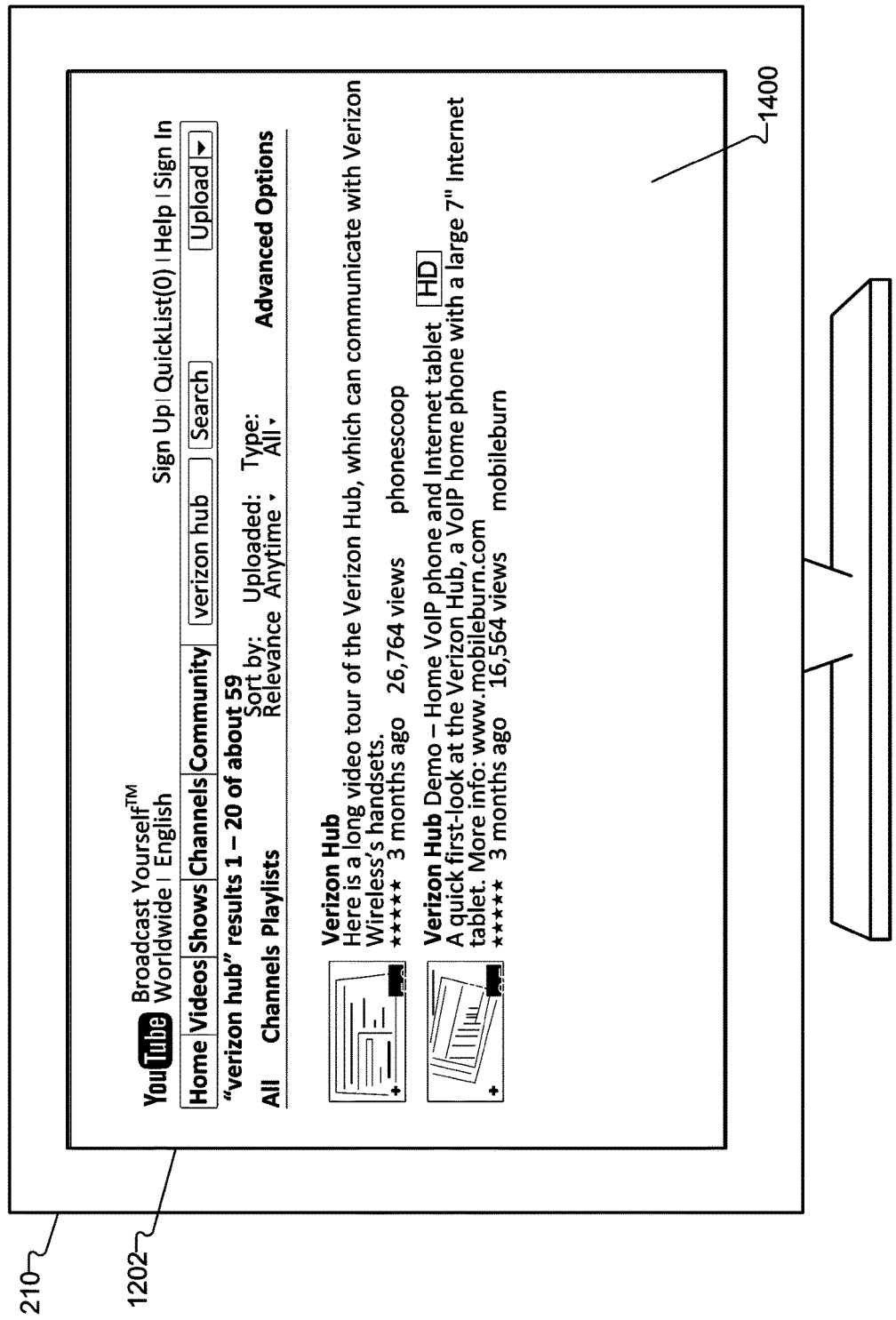

The user of mobile device 202 may provide additional input selecting a hyperlink 1302 displayed in graphical user interface 1300 of FIG. 13. Mobile device 202 may request, receive, and display data content corresponding to the selected hyperlink 1302. In addition, data content corresponding to the selected hyperlink 1302 may be optimized and transmitted from the proxy server 502 to set-top-box device 208 for display by display device 210. FIG. 14 illustrates a graphical user interface 1400 displayed on display screen 1202 of display device 210. As shown, data content (e.g., a web page) corresponding to the selected hyperlink 1302 is displayed therein. Graphical user interface 1400 shown in FIG. 14 may coincide with a graphical user interface display of mobile device 202.

In the above-described manner, one or more graphical user interface displays of mobile device 202 may be cast for display by display device 210 associated with set-top-box device 208 and/or by one or more other devices registered with mobile device 202 for multi-screen display casting. Typically, coinciding graphical user interfaces, such as graphical user interface 1200 displayed by mobile device 202 and display device 210, may be displayed substantially concurrently and in real time or near real time by mobile device 202 and display device 210. In certain examples, a graphical user interface may be displayed by display device 210 associated with set-top-box device 208 before the coinciding graphical user interface is displayed by mobile device 202, even when the request to display the graphical user interface is initiated by mobile device 202. This may be due at least in part to data content being transmitted more quickly over subscriber television network 212 than wireless data network 206.

While the above-described example relates to displaying data content such as e-mail and/or web content, the principles described herein may be applied to other data content that may be displayed by mobile device 202 such that the data content may also be displayed by display device 210 associated with set-top-box device 208.

Also, while the above-described example relates to a user utilizing mobile device 202 to control a browsing session, in certain embodiments, a user input device such as user input device 806 shown in FIG. 8 may be used to provide input to set-top-box device 208 to control one or more aspects of a browsing session running on mobile device 202. For example, certain user input fields and/or scripts included in a graphical user interface displayed by mobile device 202 may be mimicked or otherwise created in a coinciding graphical user interface (e.g., in a table text overlay) displayed by display device 210 associated with set-top-box device 208. Returning to FIG. 13, graphical user interface 1300 includes graphics 1304 indicating user input that may be provided by a user of set-top-box device 208 utilizing a remote control device in communication with set-top-box device 208. In particular, the user may select an "OK" button to open hyperlink 1302. Other input fields and/or scripts may be similarly created and used to control a browsing session of mobile device 202 from set-top-box device 208.

User input control signals may be transmitted from set-top-box device 208 to proxy server 502 and/or mobile device 202 using any suitable communication connection(s), including any of those described above. For example, set-top-box device 208 may receive user control input and transmit data representative of the user control input to proxy server 502. In some examples, proxy server 502 may process the user control input and cause a graphical user interface display of mobile device 202 and display device 210 associated with set-top-box device 208 to be generated and/or modified based on the user control input. For example, if a user of set-top-box device 208 utilizes user input device 806 to select hyperlink 1302 in graphical user interface 1300, proxy server 502 may receive data representative of the user control input and retrieve data content corresponding to the hyperlink 1302 from a source such as data content source 506. Proxy server 502 may then optimize and transmit a first set of the data content to mobile device 202 for display and a second set of the data content to set-top-box device 208 for display by display device 210.

As another example, set-top-box device 208 may receive user control input and transmit data representative of the user control input to mobile device 202. In some examples, mobile device 202 may process the user control input as if the user control input were received directly by mobile device 202 from the user. Accordingly, mobile device 202 may request, receive, and display data content as described above in response to the user control input. For example, if a user of set-top-box device 208 utilizes user input device 806 to select hyperlink 1302 in graphical user interface 1300, mobile device 202 may receive data representative of the user selection of hyperlink 1302 and may process the user control input as if it were received directly by the mobile device 202 from the user. That is, mobile device 202 may function as described above to access and display data content corresponding to the selected hyperlink 1302. Proxy server 502 may function as described above to optimize and transmit the data content corresponding to the selected hyperlink 1302 to mobile device 202 for display on display screen 204 and to set-top-box device 208 for display by display device 210.

In certain embodiments, set-top-box device 208 may be configured to provide one or more tools that enable a user of set-top-box device 208 to "bookmark" a graphical user interface cast to set-top-box device 208 for display by display device 210 as described above. For example, the user may utilize user input device 806 to provide input indicating a desire to "bookmark" graphical user interface 1400 displayed by display device 210 as shown in FIG. 14. With the graphical user interface 1400 bookmarked, the user may subsequently utilize user input device 806 and set-top-box device 208 to access and view the graphical user interface 1400 on display device 210, without having to initiate another multi-screen casting session (e.g., a multi-screen browsing session).

System 100 may be configured to provide the "bookmark" feature in any suitable way. For example, set-top-box device 208 may detect user input and mark a graphical user interface as "bookmarked" in response to the user input. Set-top-box device 208 may store data representative of or otherwise associated with the bookmarked graphical user interface. In certain embodiments, for example, set-top-box device 208 may store image-format data representative of the bookmarked graphical user interface. Accordingly, set-top-box device 208 may locally access the image-format data and cause the bookmarked graphical user interface to be displayed by display device 210 in response to a subsequent user request to view the graphical user interface. In certain other embodiments, set-top-box device 208 may store data that may be used to access the graphical user interface. For example, the set-top-box device 208 may store a Uniform Resource Locator ("URL") or other data indicating a source through which the graphical user interface may be accessed. Accordingly, set-top-box device 208 may remotely request and access data representative of the bookmarked graphical user interface to be displayed by display device 210 in response to a subsequent user request to view the graphical user interface. For example, set-top-box device 208 may request that proxy server 502 provide image-format data representative of the bookmarked graphical user interface.

In certain examples, when a multi-screen casting session is to be terminated, set-top-box device 208 may provide a prompt to bookmark one or more graphical user interfaces displayed during the multi-screen casting session. If a user of set-top-box device 208 provides input indicating a desire to bookmark one or more of the graphical user interface, set-top-box device 208 may cause display device 210 to display a list of graphical user interfaces displayed during the multi-screen casting session (e.g., a recent history of multi-screen browsing pages). The user may utilize user input device 806 and set-top-box device 208 to navigate the list and select (i.e., "bookmark") one or more of the graphical user interface for subsequent viewing.

Figure 15:
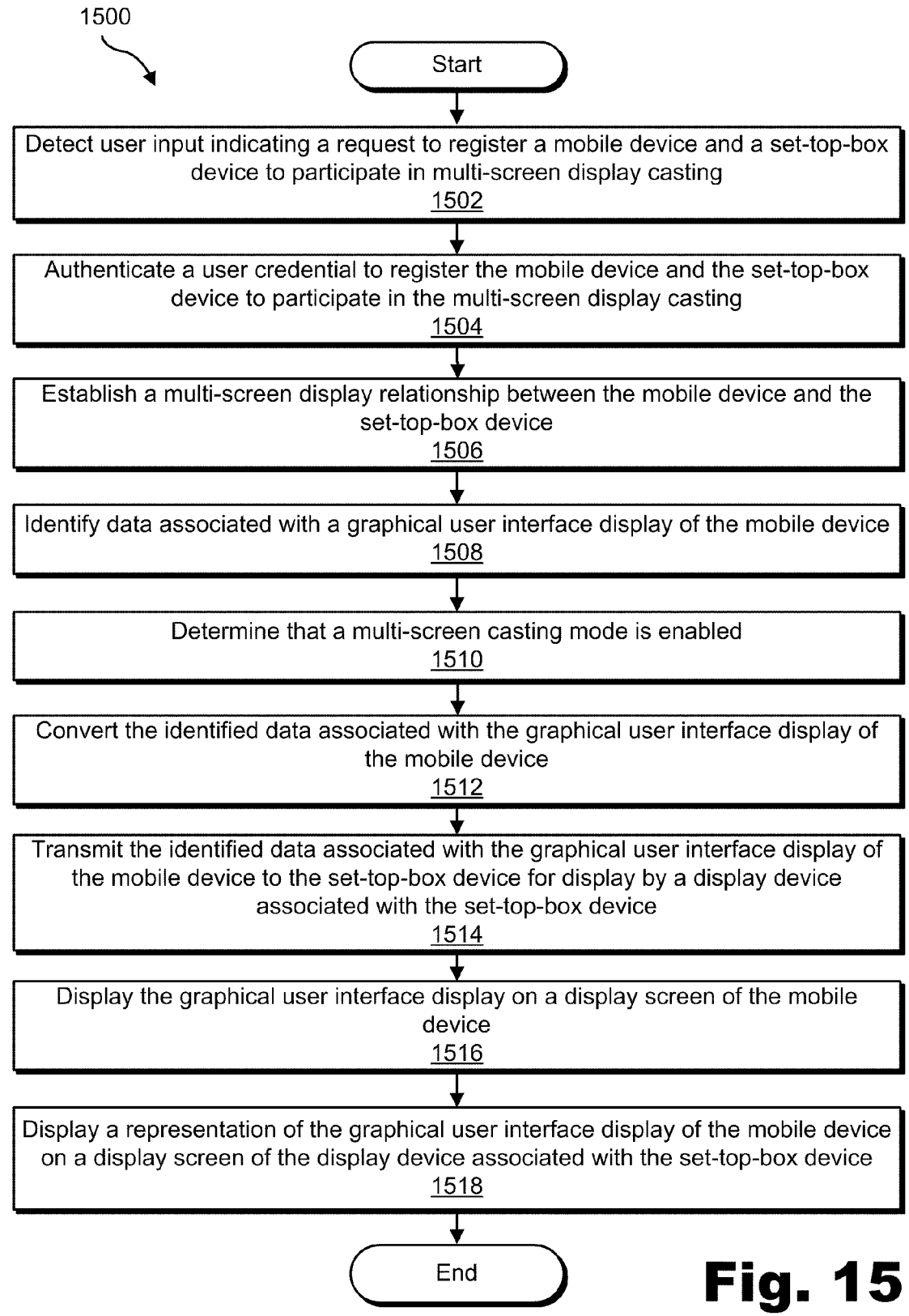
FIGS. 15-16 illustrate exemplary multi-screen casting methods.

FIG. 15 illustrates an exemplary multi-screen display casting method 1500. While FIG. 15 illustrates exemplary steps according to one embodiment, other embodiments may omit, add to, reorder, and/or modify any of the steps shown in FIG. 15. One or more of the steps shown in FIG. 15 may be performed by system 100, implementations 200, 300, 400, and 500 of system 100, and/or one or more devices implementing one or more components of system 100 (e.g., mobile device 202, set-top-box device 208, proxy server 502, etc.).

In step 1502, user input indicating a request to register a mobile device and a set-top-box device to participate in multi-screen display casting is detected. Step 1502 may be performed in any of the ways described above, including mobile device 202 or set-top-box device 208 detecting user input received via a user interface provided to a user of mobile device 202 or set-top-box device 208.

In step 1504, a user credential to register the mobile device and the set-top-box device to participate in the multi-screen display casting is authenticated. For example, registration facility 104 of system 100 may compare a user credential associated with mobile device 202, set-top-box device 208, or a user of mobile device 202 or set-top-box device 208 with a database of user credentials to determine whether a user has permission to register the mobile device 202 and the set-top-box device 208 to participate in the multi-screen display casting.

In step 1506, a multi-screen display relationship between the mobile device and the set-top-box device is established. The relationship may be established in any of the ways described above, including by generating and storing data representative of the multi-screen display relationship in data storage facility 112. In certain examples, step 1506 may be performed in response to steps 1502 and 1504.

In step 1508, data associated with a graphical user interface display of the mobile device is identified. Step 1508 may be performed in any of the ways described above.

In step 1510, a determination is made that a multi-screen casting mode is enabled. For example, multi-screen casting facility 106 may access a multi-screen casting mode data field to determine whether the multi-screen casting mode is enabled. In certain examples, step 1510 may be performed in response to identification of data associated with the graphical user interface display of mobile device 202 in step 1508.

In step 1512, the identified data associated with the graphical user interface display of the mobile device is converted. Step 1512 may be performed in any of the ways described above, including by data conversion facility 108 converting the data associated with the graphical user interface display of mobile device 202 to image-format data (e.g., from HTML code to image-format-based data). In certain examples, step 1512 may be selectively performed based on one or more attributes of the set-top-box device that is registered to participate with the mobile device 202 in multi-screen data casting.

In step 1514, the identified data associated with the graphical user interface display of the mobile device is transmitted to the set-top-box device for display by a display device associated with the set-top-box device. Step 1514 may be performed in any of the ways described above.

In step 1516, the graphical user interface display is displayed on a display screen of the mobile device. Step 1516 may be performed in any of the ways described above, including by mobile device 202 receiving a first set of data content, interpreting the first set of data content, and displaying graphics representative of the first set of data content on display screen 204 of mobile device 202.

In step 1518, a representation of the graphical user interface display of the mobile device is displayed on a display screen of the display device associated with the set-top-box device. Step 1518 may be performed in any of the ways described above. For example, set-top-box device 208 may receive a second set of data content and cause a representation of the second set of data content to be displayed by display device 210. In certain embodiments, the representation may comprise an image-format-based representation of the graphical user interface display of the mobile device 202. For instance, set-top-box device 202 may receive the second set of data content in the form of one or more image files representative of the graphical user interface display the mobile device 202.

Figure 16:
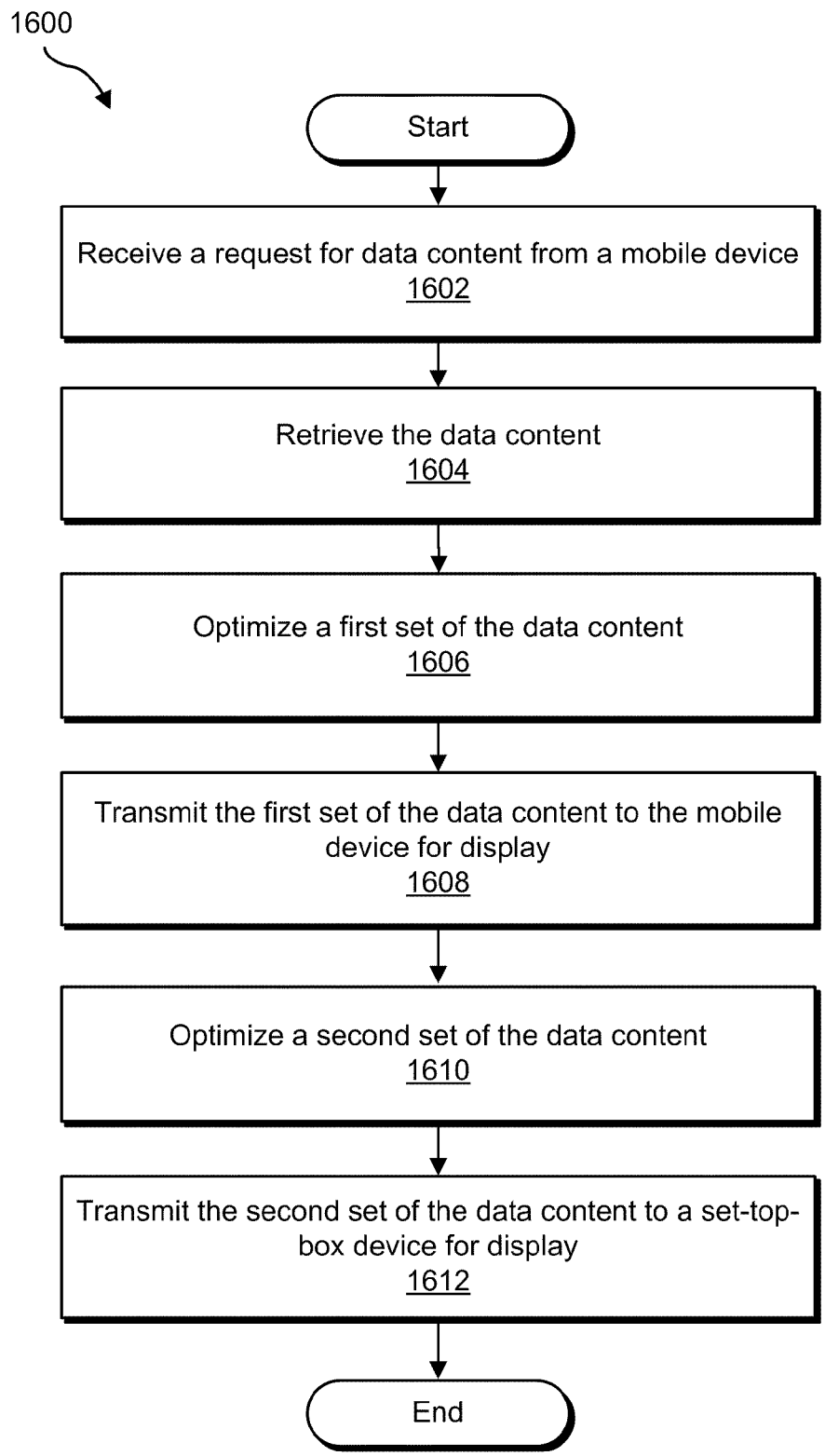

FIG. 16 illustrates another exemplary multi-screen display casting method 1600. While FIG. 16 illustrates exemplary steps according to one embodiment, other embodiments may omit, add to, reorder, and/or modify any of the steps shown in FIG. 16. One or more of the steps shown in FIG. 16 may be performed by system 100, implementations 200, 300, 400, and 500 of system 100, and/or one or more devices implementing one or more components of system 100. In certain embodiments, one or more steps shown in FIG. 16 may be performed by proxy server 502.

In step 1602, a request for data content is received from a mobile device. For example, proxy server 502 may receive the request for data content from mobile device 202 by way of wireless data network 206.

In step 1604, the data content is retrieved. Step 1604 may be performed in any of the ways described above, including by proxy server 502 requesting and receiving the data content from a source such as data content source 506.

In step 1606, a first set of the data content is optimized. The optimization, which may be performed by proxy server 502, may be accomplished in any of the ways described above. For example, proxy server 502 may optimize the first set of data content for display on display screen 204 of mobile device 202, such as by cleaning up the data content, reducing a resolution associated with the data content, and/or filtering a portion of the data content from the first set of the data content.

In step 1608, the first set of the data content is transmitted to the mobile device for display. Step 1608 may be performed in any of the ways described above. For example, proxy server 502 may transmit the first set of the data content to mobile device 202 by way of wireless data network 206 for display on display screen 204 of mobile device 202.

In step 1610, a second set of the data content is optimized. Step 1610 may be performed in any of the ways described above. For example, proxy server 502 may optimize the second set of the data content for display on a display screen of display device 210 associated with set-top-box device 208. In certain examples, the optimization may include converting data content in the form of HTML code into image-format data representative of one or more graphics generated based on the HTML code. As described above, such a conversion to image-format data may allow certain data content to be displayed by a display device associated with a set-top-box device that lacks resources for interpreting HTML code and/or running a full browser application.

In step 1612, the second set of the data content is transmitted to the set-top-box device for display. Step 1612 may be performed in any of the ways described above. For example, proxy server 502 may transmit the second set of the data content to set-top-box device 208 for display on a display screen of display device 210 associated with set-top-box device 208. In certain examples, proxy server 502 may transmit the second set of the data content to set-top-box device 208 by way of subscriber television network server 504, which may configured to communicate with set-top-box device 208 by way of an IP backchannel of subscriber television network 212.

In the preceding description, various exemplary embodiments have been described with reference to the accompanying drawings. It will, however, be evident that various modifications and changes may be made thereto, and additional embodiments may be implemented, without departing from the scope of the invention as set forth in the claims that follow. For example, certain features of one embodiment described herein may be combined with or substituted for features of another embodiment described herein. The description and drawings are accordingly to be regarded in an illustrative rather than a restrictive sense.

What is claimed is:

1. A method comprising:
    establishing, by a multi-screen casting system, a multi-screen display relationship between a mobile device and a set-top-box device;
    identifying, by the multi-screen casting system, data generated by the mobile device and associated with a graphical user interface display that is currently displayed on the mobile device;
    determining, by the multi-screen casting system, that a multi-screen casting mode is enabled;
    converting, by the multi-screen casting system, the identified data generated by the mobile device and associated with the graphical user interface display of the mobile device to image-format data;
    transmitting, by the multi-screen casting system, the image-format data converted from the identified data generated by the mobile device and associated with the graphical user interface display that is currently displayed on the mobile device to the set-top-box device for concurrent display as an image-format-based representation of the graphical user interface display of the mobile device on a display screen of a display device associated with the set-top-box device while the multi-screen casting mode is enabled;
    detecting, by the multi-screen casting system, that the multi-screen casting mode is to be disabled;

prompting, by the multi-screen casting system in response to the detecting that the multi-screen casting mode is to be disabled, a user of the set-top-box to bookmark an image file associated with the image-format-based representation of the graphical user interface display currently displayed on the display screen of the display device associated with the set-top-box device;

detecting, by the multi-screen casting system, that the image file associated with the image-format-based representation of the graphical user interface display currently displayed on the display screen of the display device has been bookmarked by the user of the set-top-box device, the image file bookmarked by the user while the image-format-based representation is displayed on the display screen of the display device associated with the set-top-box device; and facilitating, by the multi-screen casting system based on the image file being bookmarked, a subsequent display of the image-format-based representation of the graphical user interface display when the multi-screen casting mode is not enabled.

2. The method of claim 1, further comprising:
displaying, by the mobile device, the graphical user interface display on a display screen of the mobile device.

3. The method of claim 1, wherein the converting comprises converting the identified data from Hypertext Markup Language code to a set of one or more image files.

4. The method of claim 1, wherein the identifying and the transmitting are selectively performed only when the multi-screen casting mode is enabled.

5. The method of claim 1, further comprising:
detecting, by the multi-screen casting system, user input indicating a request to register the mobile device and the set-top-box device to participate in multi-screen display casting;
authenticating, by the multi-screen casting system, a user credential to register the mobile device and the set-top-box device to participate in the multi-screen display casting; and
performing the establishing of the multi-screen display relationship between the mobile device and the set-top-box device in response to the request by generating and storing registration data representative of the multi-screen display relationship in a data storage facility.

6. The method of claim 1, wherein the identifying comprises:
detecting a request to access the data generated by the mobile device and associated with the graphical user interface display of the mobile device; and
determining that the request is associated with a browser module running on the mobile device.

7. The method of claim 1, wherein the identifying comprises:
detecting user input received with the mobile device;
updating the graphical user interface display of the mobile device based on the user input; and
identifying the data generated by the mobile device as associated with the updating of the graphical user interface display of the mobile device.

8. The method of claim 1, wherein the transmitting comprises transmitting the image-format data converted from the identified data generated by the mobile device and associated with the graphical user interface display of the mobile device from a proxy server configured to communicate with the mobile device by way of a wireless data network to a subscriber television network server configured to communicate with the set-top-box device by way of a subscriber television network.

9. The method of claim 8, wherein the transmitting further comprises forwarding, by the subscriber television network server, the image-format data converted from the identified data generated by the mobile device and associated with the graphical user interface display that is currently displayed on the mobile device to the set-top-box device by way of an Internet Protocol backchannel of the subscriber television network.

10. The method of claim 1, wherein the transmitting comprises transmitting the image-format data converted from the identified data generated by the mobile device and associated with the graphical user interface display of the mobile device to the set-top-box device by way of a local Wi-Fi network.

11. The method of claim 1, wherein the transmitting comprises transmitting the image-format data converted from the identified data generated by the mobile device and associated with the graphical user interface display of the mobile device to the set-top-box device by way of a local peer-to-peer wireless network.

12. The method of claim 1, wherein the graphical user interface display comprises a browser interface display generated by a browser module running on the mobile device.

13. The method of claim 1, tangibly embodied as non-transitory computer-executable instructions on at least one computer-readable medium.

14. The method of claim 1, wherein the facilitating of the subsequent display of the image-format-based representation of the graphical user interface display comprises:
directing the set-top-box device to locally store the image file in a memory of the set-top-box device in response to the detecting that the image file has been bookmarked by the user of the set-top-box device; and
directing the set-top-box device to access and provide for display the locally stored image file when the multi-screen casting mode is not enabled.

15. The method of claim 1, wherein:
the transmitting of the image-format data for concurrent display as the image-format-based representation comprises providing the image format-based representation for display in a split screen display view on the display screen associated with the set-top-box device; and
the method further comprises:
detecting, by the multi-screen casting system, a user input to toggle from the split screen display view to a full screen display view;
transmitting, by the multi-screen casting system in response to the detecting of the user input, an updated image format-based representation of the graphical user interface display of the mobile device to the set-top box device for display on the display screen associated with the set-top box device; and
replacing, by the multi-screen casting system, the image format-based representation with the updated image format-based representation such that the updated image format-based representation is provided for display in the full-screen display view on the display screen associated with the set-top box device.

16. The method of claim 1, further comprising:
tracking, by the multi-screen casting system, a plurality of image-format-based representations of the graphical user interface display displayed on the display screen associated with the set-top-box device during a time period in which the multi-screen casting mode is enabled;

providing, by the multi-screen casting system based on the tracking of the plurality of image-format based representations and for display on the display screen associated with the set-top-box device, a list of the plurality of image-format-based representations of the graphical user interface display displayed on the display screen associated with the set-top-box device during the time period in which the multi-screen casting mode is enabled; and detecting, by the multi-screen casting system from the list of the plurality of image-format-based representations of the graphical user interface display, a selection by the user to bookmark one or more image files associated with one or more of the plurality of image-format-based representations for subsequent viewing when the multi-screen casting mode is not enabled.

17. A method comprising:

receiving, by a proxy server, a request for data content from a mobile device, the request specifying that the data content be provided to the mobile device and to a set-top-box device registered to participate with the mobile device in multi-screen display casting;

determining, by a proxy server, that a multi-screen casting mode is enabled;

retrieving, by the proxy server, the data content requested by the mobile device from a data content source;

optimizing, by the proxy server, a first set of the data content requested by the mobile device for display on a display screen of the mobile device;

transmitting, by the proxy server, the optimized first set of the data content requested by the mobile device to the mobile device for display on the display screen of the mobile device;

optimizing, by the proxy server, a second set of the data content requested by the mobile device for display on a display screen of a display device associated with the set-top-box device;

transmitting, by the proxy server, the optimized second set of the data content requested by the mobile device to the set-top-box device for display on the display screen of the display device associated with the set-top-box device, the display of the optimized second set of the data content requested by the mobile device on the display device associated with the set-top-box device being concurrent with the display of the optimized first set of the data content requested by the mobile device on the display screen of the mobile device;

detecting, by the proxy server, that the multi-screen casting mode is to be disabled;

prompting, by the proxy server in response to the detecting that the multi-screen casting mode is to be disabled, a user of the set-top-box device to bookmark an image file used by the set-top-box device to display the optimized second set of the data content requested by the mobile device and currently displayed on the display screen of the display device associated with the set-top-box device;

detecting, by the proxy server, that the image file has been bookmarked by the user of the set-top-box device, the image file comprising image-format data representative of one or more graphics displayed on the display screen when the image file was bookmarked, the image file bookmarked by the user while the image-format data representative of the one or more graphics is displayed on the display screen of the display device associated with the set-top-box device; and facilitating, by the proxy server based on the image file being bookmarked, a subsequent display of the image-format data representative of the one or more graphics when the multi-screen casting mode is not enabled.

18. The method of claim 17, wherein:

the data content requested by the mobile device comprises Hypertext Markup Language ("HTML") code;

the optimized first set of data content requested by the mobile device comprises the HTML code optimized for the mobile device; and the image-format data representative of one or more graphics is generated based on the HTML code.

19. The method of claim 18, wherein the optimizing of the second set of the data content requested by the mobile device comprises:

interpreting the HTML code; and generating the image-format data representative of the one or more graphics based on the interpreting of the HTML code.

20. The method of claim 17, wherein the transmitting of the optimized second set of the data content requested by the mobile device to the set-top-box device comprises transmitting, by the proxy server, the optimized second set of the data content requested by the mobile device to the set-top-box device by way of a subscriber television network server configured to communicate with the set-top-box device.

21. The method of claim 20, wherein the transmitting of the optimized second set of the data content requested by the mobile device to the set-top-box device further comprises forwarding, by the subscriber television network server, the optimized second set of the data content requested by the mobile device to the set-top-box device by way of an Internet Protocol backchannel of a subscriber television network.

22. A system comprising:

a registration facility that establishes a multi-screen display relationship between a mobile device and a set-top-box device;

a multi-screen casting facility communicatively coupled to the registration facility and that identifies data generated by the mobile device and associated with a graphical user interface display that is currently displayed on the mobile device and determines that a multi-screen casting mode is enabled; and a data conversion facility communicatively coupled to the multi-screen casting facility and that converts the identified data generated by the mobile device and associated with the graphical user interface display of the mobile device to image-format data;

wherein the multi-screen casting facility further initiates transmission of the image-format data converted from the identified data generated by the mobile device and associated with the graphical user interface display that is currently displayed on the mobile device to the set-top-box device for concurrent display as an image-format-based representation of the graphical user interface display of the mobile device on a display screen of a display device associated with the set-top-box device while the multi-screen casting mode is enabled;

detects that the multi-screen casting mode is to be disabled;

prompts, in response to the detecting that the multi-screen casting mode is to be disabled, a user of the set-top-box device to bookmark an image file used by the set-top-box device to display the image-format-based representation of the graphical user interface display currently displayed on the display screen of the display device associated with the set-top-box device;

detects that the image file has been bookmarked by the user of the set-top-box device, the image file bookmarked by the user while the image-format-based representation is displayed on the display screen of the display device associated with the set-top-box device; and facilitates, based on the image file being bookmarked, a subsequent display of the image-format-based representation of the graphical user interface display when the multi-screen casting mode is not enabled.

23. The system of claim 22, wherein:
the mobile device displays the graphical user interface display on a display screen of the mobile device.

24. The system of claim 22, wherein the mobile device and the set-top-box device are communicatively coupled by at least one of a local peer-to-peer wireless connection, a local wireless network, and a server subsystem.

25. The system of claim 22, wherein the mobile device and the set-top-box device are communicatively coupled by a server subsystem comprising:

a subscriber television network server that communicates with the set-top-box device by way of an Internet Protocol backchannel of a subscriber television network; and a proxy server that
communicates with the mobile device by way of a wireless data network, and
communicates with the subscriber television network server to form a communication bridge between the wireless data network and the subscriber television network.

* * * * *